United States Patent
Ghosh et al.

(10) Patent No.: US 10,813,053 B2
(45) Date of Patent: *Oct. 20, 2020

(54) DOWNLINK POWER CONTROL ENHANCEMENTS FOR MULTI-HOP INTEGRATED ACCESS AND BACKHAUL

(71) Applicant: AT&T Intellectual Property I, L.P., Atlanta, GA (US)

(72) Inventors: Arunabha Ghosh, Austin, TX (US); Thomas Novlan, Cedar Park, TX (US); Xiaoyi Wang, Austin, TX (US); Ralf Bendlin, Cedar Park, TX (US); Aditya Chopra, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/582,087

(22) Filed: Sep. 25, 2019

(65) Prior Publication Data

US 2020/0053655 A1 Feb. 13, 2020

Related U.S. Application Data

(63) Continuation of application No. 16/101,024, filed on Aug. 10, 2018, now Pat. No. 10,470,136.

(51) Int. Cl.
*H04B 7/15* (2006.01)
*H04W 52/14* (2009.01)
(Continued)

(52) U.S. Cl.
CPC ......... *H04W 52/143* (2013.01); *H04L 5/005* (2013.01); *H04W 56/001* (2013.01); *H04W 88/10* (2013.01)

(58) Field of Classification Search
CPC ... H04W 16/14; H04W 52/146; H04W 52/08; H04W 72/0473; H04W 72/1289;
(Continued)

(56) References Cited

U.S. PATENT DOCUMENTS 6,738,640 B1 5/2004 Baker et al.
7,466,985 B1 12/2008 Handforh et al.
(Continued)

FOREIGN PATENT DOCUMENTS

WO 02/01893 A2 1/2002
WO 2016/199768 A1 12/2016
(Continued)

OTHER PUBLICATIONS

Notice of Allowance received for U.S. Appl. No. 16/101,024 dated Jun. 26, 2019, 31 pages.
(Continued)

*Primary Examiner* — Tu X Nguyen
(74) *Attorney, Agent, or Firm* — Amin, Turocy & Watson, LLP

(57) ABSTRACT

Power control can be employed, whereby a power control adjustment can be determined by a relay distributed unit (DU) device, based on a measurement of the power level of received access uplink transmissions, and a measurement of the power level of a reference signal received from a donor DU via a backhaul downlink transmission. The power control adjustment can be transmitted to the donor distributed unit device, which uses the power control adjustment to reduce the amount of power of downlink transmissions to the relay distributed unit device.

20 Claims, 16 Drawing Sheets

(51) Int. Cl.
*H04W 88/10* (2009.01)
*H04L 5/00* (2006.01)
*H04W 56/00* (2009.01)

(58) Field of Classification Search
CPC ... H04W 36/30; H04W 52/18; H04W 52/245; H04W 72/0406; H04W 72/0413; H04W 28/0221; H04W 4/027; H04W 4/029; H04W 52/00; H04W 52/0245; H04W 52/10; H04W 52/14; H04W 52/143; H04W 52/228; H04W 52/24; H04W 52/283; H04W 52/346; H04W 52/367; H04W 52/46; H04W 72/121; H04W 84/045; H04W 84/12; H04W 84/18; H04W 88/04; H04W 88/06
See application file for complete search history.

(56) References Cited

U.S. PATENT DOCUMENTS

| | | |
|---|---|---|
| 8,275,408 B2 | 9/2012 | Attar et al. |
| 8,488,562 B2 | 7/2013 | Nagaraja |
| 8,737,289 B2 | 5/2014 | Seo et al. |
| 8,849,339 B2 | 9/2014 | Anto et al. |
| 9,763,197 B2 | 9/2017 | Damnjanovic et al. |
| 9,794,051 B2 | 10/2017 | Feng et al. |
| 2002/0136193 A1 | 9/2002 | Chang et al. |
| 2003/0228865 A1 | 12/2003 | Terry |
| 2005/0176437 A1 | 8/2005 | Mir |
| 2009/0029645 A1 | 1/2009 | Leroudier |
| 2015/0245272 A1 | 8/2015 | Lindoff et al. |
| 2016/0198475 A1 | 7/2016 | Uchiyama et al. |
| 2017/0064731 A1 | 3/2017 | Wang et al. |
| 2017/0230919 A1* | 8/2017 | Siomina ............ H04W 52/346 |
| 2018/0035389 A1 | 2/2018 | Hessler et al. |
| 2018/0092139 A1 | 3/2018 | Novlan et al. |
| 2018/0132270 A1 | 5/2018 | Zeng et al. |

FOREIGN PATENT DOCUMENTS

| | | |
|---|---|---|
| WO | 2017/052869 A1 | 3/2017 |
| WO | 2018/056707 A1 | 3/2018 |
| WO | 2018/084603 A1 | 5/2018 |

OTHER PUBLICATIONS

Islam et al., "Investigation of Performance in Integrated Access and Backhaul Networks", URL : https://arxiv.org/pdf/1804.00312.pdf, arXiv preprint arXiv:1804.00312, 2018, 6 pages.

Saha et al., "Integrated mmWave Access and Backhaul in 5G: Bandwidth Partitioning and Downlink Analysis", URL : https://arxiv.org/pdf/1710.06255.pdf, arXivpreprint arXiv:1710.06255, 2017, 6 pages.

Mismar et al., "Q-Learning Algorithm for VoITE Closed-Loop Power Control in Indoor Small Cells", URL :https://arxiv.org/pdf/1707.03269.pdf, arXiv:1707.03269v4, 2018, 7 pages.

Haider et al., "Investigation of Open-Loop Transmit Power Control Parameters for Homogeneous and Heterogeneous Small-Cell Uplinks", ETRI Journal, vol. 40, No. 1, 2018, pp. 51-60.

\* cited by examiner

DOWNLINK POWER CONTROL ENHANCEMENTS FOR MULTI-HOP INTEGRATED ACCESS AND BACKHAUL

RELATED APPLICATION

The subject patent application is a continuation of, and claims priority to, U.S. patent application Ser. No. 16/101,024, filed Aug. 10, 2018, and entitled "DOWNLINK POWER CONTROL ENHANCEMENTS FOR MULTI-HOP INTEGRATED ACCESS AND BACKHAUL," the entirety of which application is hereby incorporated by reference herein.

TECHNICAL FIELD

The present application relates generally to the field of wireless communication and, more specifically, to controlling downlink power levels at a relay distributed unit in a multi-hop integrated access and backhaul (IAB) communications in a wireless network.

BACKGROUND

Radio technologies in cellular communications have grown rapidly and evolved since the launch of analog cellular systems in the 1980s, starting from the First Generation (1G) in 1980s, Second Generation (2G) in 1990s, Third Generation (3G) in 2000s, and Fourth Generation (4G) in 2010s (including Long Term Evolution (LTE) and variants of LTE). Fifth generation (5G) access networks, which can also be referred to as New Radio (NR) access networks, are currently being developed and expected to fulfill the demand for exponentially increasing data traffic, and to handle a very wide range of use cases and requirements, including among others mobile broadband (MBB) services, enhanced mobile broadband (eMBB) services and machine type communications (e.g., involving Internet of Things (IOT) devices).

In particular, NR access networks will seek to utilize the wireless communications links between donor distributed unit (DU) devices and relay distributed unit (DU) devices (backhaul links), and also utilize the communications links between distributed units and user equipment (UEs) (access links), employing techniques for integrated access and backhaul (IAB), which is not without challenges.

The above-described background relating to wireless networks is merely intended to provide a contextual overview of some current issues and is not intended to be exhaustive. Other contextual information may become further apparent upon review of the following detailed description.

BRIEF DESCRIPTION OF THE DRAWINGS

Non-limiting and non-exhaustive embodiments of the subject application are described with reference to the following figures, wherein like reference numerals refer to like parts throughout the various views unless otherwise specified.

DETAILED DESCRIPTION

Figure 1:
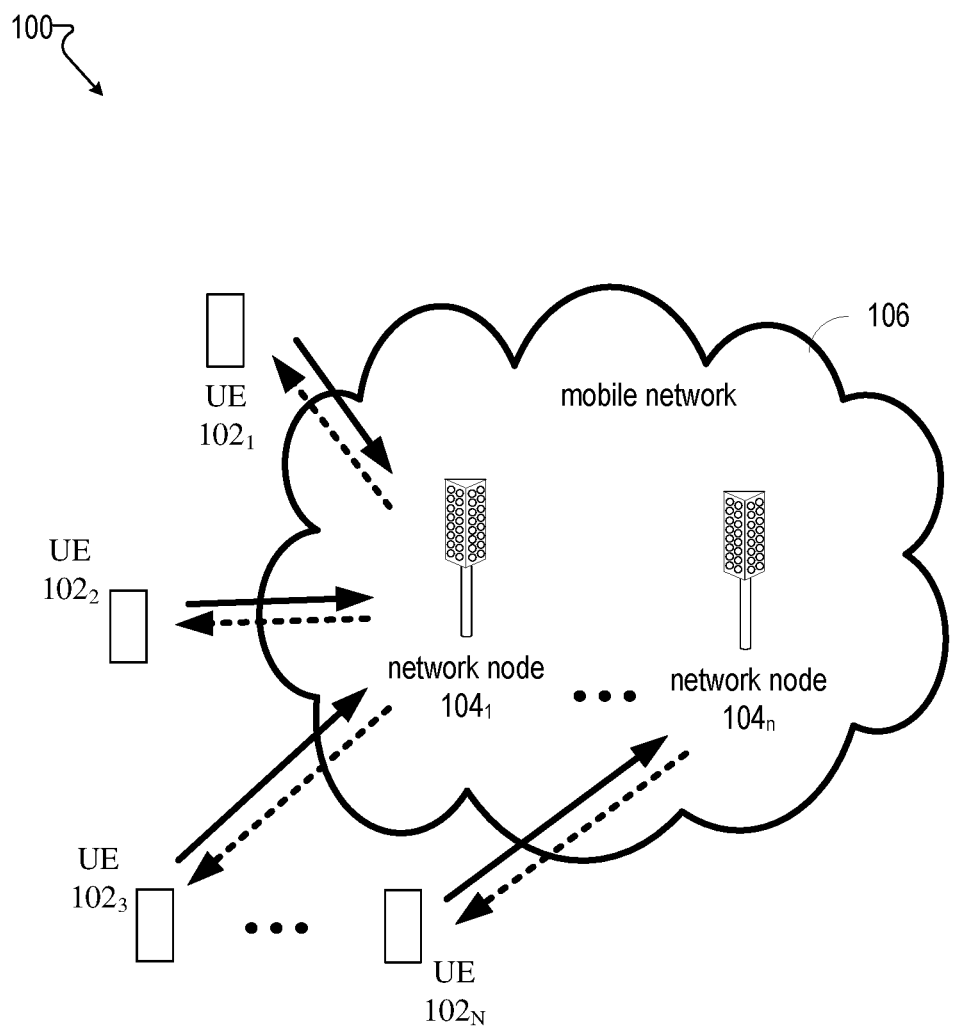
FIG. 1 illustrates an example wireless communication system having a network node device (also referred to herein as a network node) and user equipment (UE), in accordance with various aspects and example embodiments of the subject application.

The subject disclosure is now described with reference to the drawings, wherein like reference numerals are used to refer to like elements throughout. The following description and the annexed drawings set forth in detail certain illustrative aspects of the subject matter. However, these aspects are indicative of but a few of the various ways in which the principles of the subject matter can be employed. Other aspects, advantages, and novel features of the disclosed subject matter will become apparent from the following detailed description when considered in conjunction with the provided drawings. In the following description, for purposes of explanation, numerous specific details are set forth in order to provide a more thorough understanding of the subject disclosure. It may be evident, however, that the subject disclosure can be practiced without these specific details. In other instances, structures and devices are shown in block diagram form to facilitate describing the subject disclosure.

The methods and operations (e.g., processes and logic flows) described in this specification can be performed by devices (e.g., a relay DU, donor DU, etc.) comprising programmable processors that execute machine executable instructions (e.g., computer program product, computer-readable instructions, software, software programs, software applications, software modules, etc.) to facilitate performance of the operations described herein. Examples of such devices can be devices comprising circuitry and components as described in FIG. 15 and FIG. 16.

The present patent application provides for a power control system and process, whereby a power control adjustment is determined by a relay distributed unit device, based on a measurement of the power level of received access uplink (UL) transmissions, and a measurement of the power level of a reference signal received from a donor DU via a backhaul downlink (DL) transmission. The power control adjustment is transmitted to the donor distributed unit device, which uses the power control adjustment to reduce the amount of power of DL transmissions to the relay distributed unit device.

FIG. 1 illustrates an example wireless communication system 100 (also referred to as wireless system 100, mobile system 100, mobile communications system 100) in accordance with various aspects and embodiments of the subject application. In example embodiments (also referred to as non-limiting embodiments), wireless communications system 100 can comprise a mobile (also referred to as cellular) mobile network 106, which can comprise one or more mobile networks typically operated by communication service providers. The wireless communication system 100 can also comprise one or more user equipment (UE) 102$_{1-N}$ (also referred to as UE 102). UE 102$_{1-N}$ can communicate with one another via one or more network node devices (also referred to as network nodes) 104$_{1-N}$ (referred to as network node 104 in the singular) of the mobile network 106. The dashed arrow lines from the network nodes 104$_{1-N}$ to the UE 102$_{1-N}$ represent downlink (DL) communications and the solid arrow lines from the UE 102$_{1-N}$ to the network nodes 104$_{1-N}$ represent uplink (UL) communications.

UE 102 can comprise, for example, any type of device that can communicate with mobile network 106, as well as other networks (see below). The UE 102 can have one or more antenna panels having vertical and horizontal elements. Examples of a UE 102 comprise a target device, device to device (D2D) UE, machine type UE, or UE capable of machine to machine (M2M) communications, personal digital assistant (PDA), tablet, mobile terminal, smart phone, laptop mounted equipment (LME), universal serial bus (USB) dongles enabled for mobile communications, a computer having mobile capabilities, a mobile device such as cellular phone, a dual mode mobile handset, a laptop having laptop embedded equipment (LEE, such as a mobile broadband adapter), a tablet computer having a mobile broadband adapter, a wearable device, a virtual reality (VR) device, a heads-up display (HUD) device, a smart car, a machine-type communication (MTC) device, and the like. UE 102 can also comprise IOT devices that communicate wirelessly.

Mobile network 106 can include various types of disparate networks implementing various transmission protocols, including but not limited to cellular networks, femto networks, picocell networks, microcell networks, internet protocol (IP) networks, Wi-Fi networks associated with the mobile network (e.g., a Wi-Fi "hotspot" implemented by a mobile handset), and the like. For example, in at least one implementation, wireless communications system 100 can be or can include a large scale wireless communication network that spans various geographic areas, and comprise various additional devices and components (e.g., additional network devices, additional UEs, network server devices, etc.).

Still referring to FIG. 1, mobile network 106 can employ various cellular systems, technologies, and modulation schemes to facilitate wireless radio communications between devices (e.g., the UE 102 and the network node 104). While example embodiments might be described for 5G New Radio (NR) systems, the embodiments can be applicable to any radio access technology (RAT) or multi-RAT system where the UE operates using multiple carriers. For example, wireless communications system 100 can be of any variety, and operate in accordance with standards, protocols (also referred to as schemes), and network architectures, including but not limited to: global system for mobile communications (GSM), 3GSM, GSM Enhanced Data Rates for Global Evolution (GSM EDGE) radio access network (GERAN), Universal Mobile Telecommunications Service (UMTS), General Packet Radio Service (GPRS), Evolution-Data Optimized (EV-DO), Digital Enhanced Cordless Telecommunications (DECT), Digital AMPS (IS-136/TDMA), Integrated Digital Enhanced Network (iDEN), Long Term Evolution (LTE), LTE Frequency Division Duplexing (LTE FDD), LTE time division duplexing (LTE TDD), Time Division LTE (TD-LTE), LTE Advanced (LTE-A), Time Division LTE Advanced (TD-LTE-A), Advanced eXtended Global Platform (AXGP), High Speed Packet Access (HSPA), Code Division Multiple Access (CDMA), Wideband CDMA (WCMDA), CDMA2000, Time Division Multiple Access (TDMA), Frequency Division Multiple Access (FDMA), Multi-carrier Code Division Multiple Access (MC-CDMA), Single-carrier Code Division Multiple Access (SC-CDMA), Single-carrier FDMA (SC-FDMA), Orthogonal Frequency Division Multiplexing (OFDM), Discrete Fourier Transform Spread OFDM (DFT-spread OFDM), Single Carrier FDMA (SC-FDMA), Filter Bank Based Multi-carrier (FBMC), zero tail DFT-spread-OFDM (ZT DFT-s-OFDM), Unique Word OFDM (UW-OFDM), Unique Word DFT-spread OFDM (UW DFT-Spread-OFDM), Cyclic Prefix OFDM (CP-OFDM), resource-block-filtered OFDM, Generalized Frequency Division Multiplexing (GFDM), Fixed-mobile Convergence (FMC), Universal Fixed-mobile Convergence (UFMC), Multi Radio Bearers (RAB), Wi-Fi, Worldwide Interoperability for Microwave Access (WiMax), and the like.

Still referring to FIG. 1, in example embodiments, UE 102 can be communicatively coupled (or in other words, connected) to a network node 104 of the mobile network 106. Network node 104 can have a cabinet and other protected enclosures, an antenna mast, and multiple antennas for performing various transmission operations (e.g., MIMO operations). Each network node 104 can serve several cells, also called sectors, depending on the configuration and type of antenna. Network node 104 can comprise NodeB devices, base station (BS) devices, mobile stations, access point (AP) devices, and radio access network (RAN) devices. Network node 104 can also include multi-standard radio (MSR) radio node devices, including but not limited to: an MSR BS, an eNode B device (e.g., evolved NodeB), a network controller, a radio network controller (RNC), a base station controller (BSC), a relay device, a base transceiver station (BTS), an access point, a transmission point (TP), a transmission/receive point (TRP), a transmission node, a remote radio unit (RRU), a remote radio head (RRH), nodes in distributed antenna system (DAS), and the like. In 5G terminology, the network node is referred to by some as a gNodeB device.

Still referring to FIG. 1, in various embodiments, mobile network 106 can be configured to provide and employ 5G cellular networking features and functionalities. 5G wireless communication networks are expected to fulfill the demand of exponentially increasing data traffic and to allow people and machines to enjoy gigabit data rates with virtually zero latency. Compared to 4G, 5G supports more diverse traffic scenarios. For example, in addition to the various types of data communication between conventional UEs (e.g., phones, smartphones, tablets, PCs, televisions, Internet enabled televisions, etc.) supported by 4G networks, 5G networks can be employed to support data communication between smart cars in association with driverless car environments, as well as machine type communications (MTCs). Considering the different communication needs of these different traffic scenarios, the ability to dynamically configure waveform parameters based on traffic scenarios while retaining the benefits of multi carrier modulation schemes (e.g., OFDM and related schemes) can provide a significant contribution to the high speed/capacity and low latency demands of 5G networks. With waveforms that split the bandwidth into several sub-bands, different types of services can be accommodated in different sub-bands with the most suitable waveform and numerology, leading to an improved spectrum utilization for 5G networks.

Still referring to FIG. 1, to meet the demand for data centric applications, features of proposed 5G networks may comprise: increased peak bit rate (e.g., 20 Gbps), larger data volume per unit area (e.g., high system spectral efficiency—for example about 3.5 times that of spectral efficiency of long term evolution (LTE) systems), high capacity that allows more device connectivity both concurrently and instantaneously, lower battery/power consumption (which reduces energy and consumption costs), better connectivity regardless of the geographic region in which a user is located, a larger numbers of devices, lower infrastructure development costs, and higher reliability of the communications. Thus, 5G networks may allow for: data rates of several tens of megabits per second should be supported for tens of thousands of users, 1 Gbps to be offered simultaneously to tens of workers on the same office floor, for example; several hundreds of thousands of simultaneous connections to be supported for massive sensor deployments; improved coverage, enhanced signaling efficiency; reduced latency compared to LTE.

The upcoming 5G access network may utilize higher frequencies (e.g., >6 GHz) to aid in increasing capacity. Currently, much of the millimeter wave (mmWave) spectrum, the band of spectrum between 30 gigahertz (Ghz) and 300 Ghz is underutilized. The millimeter waves have shorter wavelengths that range from 10 millimeters to 1 millimeter, and these mmWave signals experience severe path loss, penetration loss, and fading. However, the shorter wavelength at mmWave frequencies also allows more antennas to be packed in the same physical dimension, which allows for large-scale spatial multiplexing and highly directional beamforming.

Figure 2:
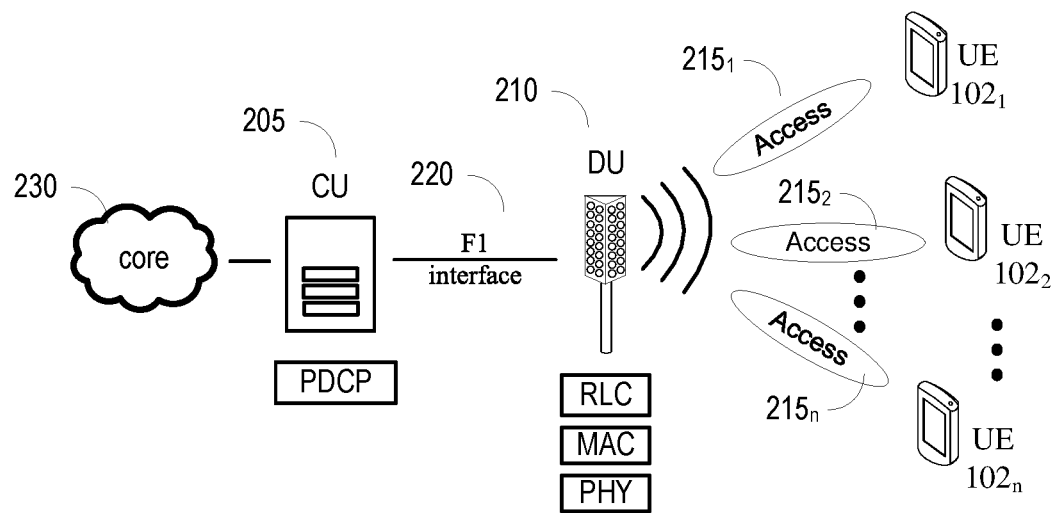
FIG. 2 illustrates an example wireless communication system having a split radio access network (RAN) architecture, in accordance with various aspects and example embodiments of the subject application.

FIG. 2 illustrates an example embodiment of a mobile network (e.g., wireless communications system 100) in which non-real-time control functions are centrally hosted (e.g., in a central unit (CU) 205) to direct transmissions across coverage areas, while real time functions are deployed at a distributed unit (DU) 210. The DU 210 can manage the air interface resources between the DU 210 and UEs (e.g., UE $102_{1-n}$). In this split RAN protocol architecture, which is native to the 3GPP specification and can be expected to be employed in the upcoming 5G RAN network, some of the various functionalities of a network node (e.g., network node 104) can be split and implemented in DUs, as will be described below. The upcoming 5G access network can also employ an architecture in which a user plane and control plane are separated, wherein complex control plane functions are abstracted from forwarding elements, simplifying user plane operations by relocating control logic to physical or virtual servers. Each plane carries a different type of traffic and can be implemented as overlay networks that runs independently on top of another one, although supported by the same physical infrastructure. The user plane (sometimes known as the data plane, forwarding plane, carrier plane, or bearer plane) carries the network user traffic, and the control plane carries signaling traffic. In example embodiments, the planes can be implemented in the firmware of routers and switches.

In the example split RAN protocol architecture shown in FIG. 2, on the user plane, the Packet Data Convergence Protocol (PDCP) sublayers can reside at the CU 205, while the radio link control (RLC), media access control (MAC), and PHY layers can reside at the DU 210. As is known in the art, the PDCP layer, part of LTE layer 2 protocols, can be responsible for compression of the IP header of user-plane data packets (e.g., using the robust header compression (RoHC) protocol) to reduce the number of bits transmitting over the radio interface, ciphering and integrity protection of RRC messages, in-sequence delivery and retransmission of PDCP service data units (SDUs), and duplicate detection. The RLC layer is responsible for segmentation, concatenation, ARQ retransmission (e.g., error correction through automatic repeat request (ARQ)) and in-sequence delivery to higher layers. The media access control MAC layer is responsible for multiplexing of RLC protocol data units, HARQ retransmission (e.g., error correction through HARQ), scheduling for UL and DL, logical channel prioritization, etc. The physical layer (PHY) layer is responsible for coding/decoding, modulation/demodulation, multi-antenna processing, and mapping of signals to the appropriate physical time-frequency resources. Mapping of transport channels to physical channels is also handled at the PHY layer.

User plane data is carried on data radio bearers (DRBs) that traverse the above described user plane RAN protocol architecture. On the control plane, signaling radio bearers (SRBs) are set up that carry control messages from the RRC layer also utilize the PDCP layer at the CU, and are further carried down through the RLC, MAC, and PHY layers at the DU to be delivered to the UE (e.g., UE 102) via access link 215 (also referred to as $215_{1-n}$) over the air interface. Each UE 102 can be allocated multiple DRBs and SRBs by the network. The network interface (e.g., communications interface) between the CU 205 and DU 210 can be referred to as the F1 (or F1-U) interface 220 (e.g., per 3GPP specifications).

The CU 205 can be operable to communicate with a core 230 (e.g., evolved packet core (EPC)), via for example, a fiber interface. The core can serve as the interface for connection to networks such as the internet, corporate private networks, IP multimedia subsystems, etc. (e.g., one or more communication service provider networks).

Figure 3:
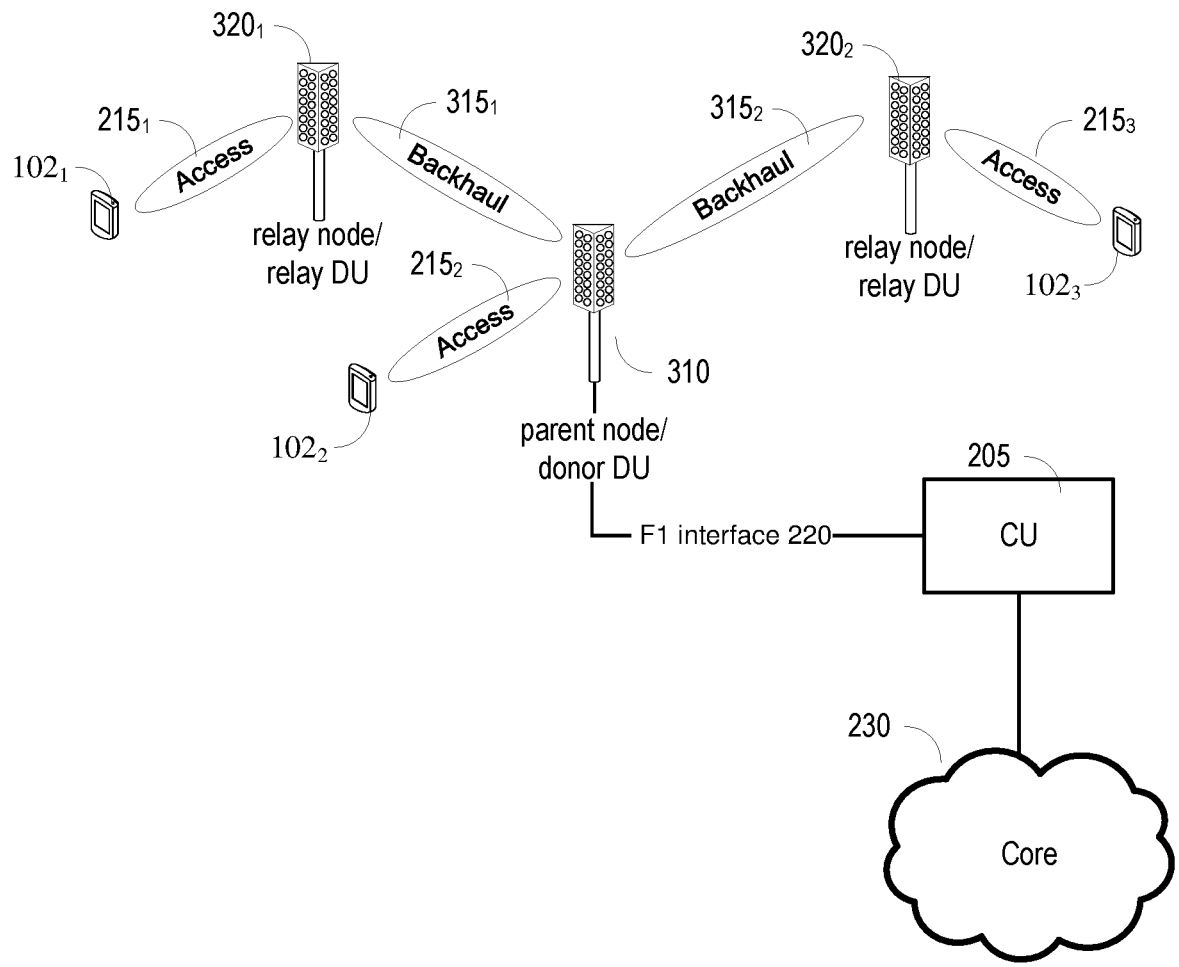
FIG. 3 illustrates an example wireless communication system having a split radio access network architecture, wherein a donor distributed unit (DU) can communicate via other DUs via backhaul links, and with UEs via access links, in accordance with various aspects and example embodiments of the subject application.

FIG. 3 illustrates of an example embodiment of a RAN network (e.g., wireless communications system 100) in which the DU 210 comprises a donor DU 310 (also referred to as a donor node) that can communicate with one of more relay DUs (also referred to as relay nodes). In FIG. 3, donor DU 310 can communicate with one or more relay DUs (e.g., relay DU $320_1$, relay DU $320_2$) utilizing "backhaul" links (e.g., backhaul link $315_1$, backhaul link $315_2$, also referred to as backhaul links $315_{1-N}$ in the plural), and can communicate with one or more UEs (for example, in FIG. 3, UE $102_2$) using access links (e.g., access link $215_2$). Relay DUs, which can also comprise the radio link control (RLC), media access control (MAC), and PHY layers, can be located at the edge of a cell, and can aid in meeting the ever-increasing demand for coverage and capacity. In example embodiments, a relay DU is typically smaller in size than a network node (e.g., network node 104), has lower power consumption, and can connect via a backhaul link to another DU (which can be a donor DU or another relay DU), and can communicate via access links with UEs (also referred to as child nodes). Of note, the backhaul and access links share the same spectrum, and as such, the communications between the donor DUs, relay DUs, and the UEs can be said to be integrated, and referred to as integrated access and backhaul (IAB) links. Due to the expected larger bandwidth available for NR compared to LTE (e.g. mmWave spectrum) along with the native deployment of massive MIMO or multi-beam systems in NR, there is now an opportunity to develop and deploy IAB links. IAB links can allow for easier deployment of a dense network of self-backhauled NR cells in a more integrated manner by building upon many of the control and data channels/procedures defined for providing access to UEs.

Still referring to FIG. 3, as an example, a UE (e.g., UE $102_1$ as shown in FIG. 3) can transmit a signal via a wireless access communications link (e.g., access link $215_1$) to relay DU $320_1$, which can then relay (e.g., transmit, send, retransmit) the signal via a backhaul link (e.g., backhaul link $315_1$) to the donor DU 310. In some instances, a donor DU 310 can communicate between a relay DU, and also communicate with one or more UEs. For example, as shown in FIG. 3, donor DU 310 can communicate with relay DU $320_1$ and relay DU $320_2$, and can also communicate with UE $102_2$, for example, using multiplexing and multiple access schemes (described below).

In example embodiments of the subject application, the backhaul communications between donor units (e.g., between donor DU 310 and relay DU $320_1$) and the access communications between user equipment (UEs $102_{1-N}$) and donor units (e.g., between donor DU 310 and UE $102_2$), can be integrated, resulting in an integrated access and backhaul (IAB) link. For example, these communications can be multiplexed in the scheduler of a DU, wherein the scheduler can be operable to determine resource assignments for transmissions between UEs and DUs, and between the donor DU and the relay DU. Typically, schedulers will assign resources based upon numerous criteria (e.g., base station throughput, user latency, fairness, etc.). Depending on factors and conditions (e.g., condition of the channels, number of DUs, number of UEs in a cell, etc.), the schedulers of the DUs can be operative to select from a variety of multiplexing schemes that can integrate the transmission of the backhaul links and access links. For example, referring to FIG. 3, donor DU can be sending to and receiving signals from both UE $102_2$ and from relay DU $320_1$. The transmissions can be multiplexed so as to avoid interference. Some example transmission schemes integrating access and backhaul transmissions are described further below.

Figure 4:
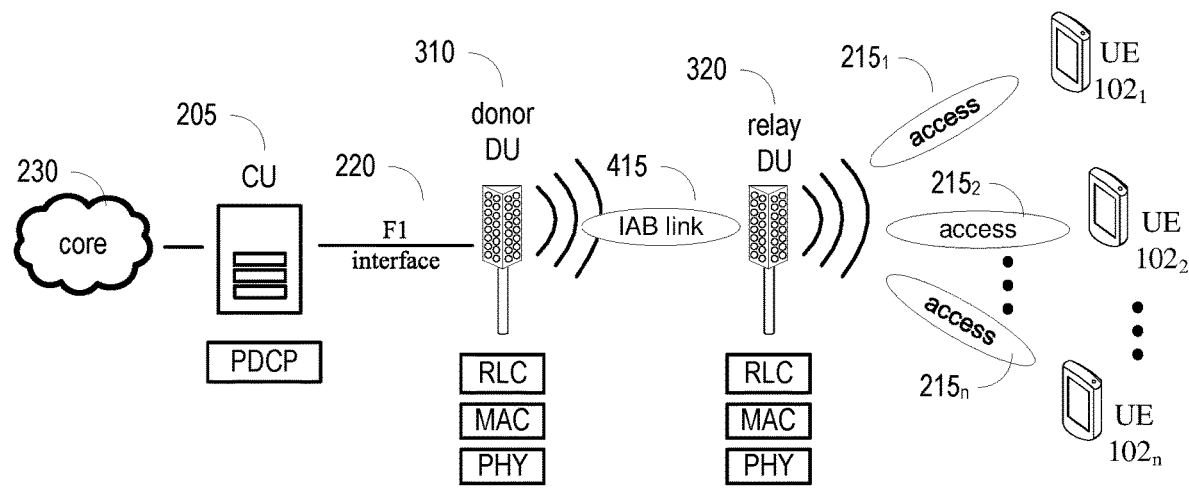
FIG. 4 illustrates an example wireless communication system having a split RAN architecture and an integrated access and backhaul (IAB) link, in accordance with various aspects and example embodiments of the subject application.

FIG. 4 shows another example illustration wherein the multiplexed access and backhaul transmissions are represented with IAB link 415, wherein a DU (e.g., donor DU 310, relay DU 320) can multiplex data via access and backhaul links in time, frequency, or space (e.g. beam-based operation) to communicate with other DUs (e.g., relay DU 320), or with UEs (e.g., UE $102_{1-N}$), and wherein the relay DUs can also communicate with other DUs and UEs. The IAB link 415 between the donor DU 310 and the relay DU 320 can carry user plane and control plane data for all the UEs $102_{1-N}$ being served by the relay DU 320. Hence, the IAB link 415 can comprise multiplexed packets for/from multiple different bearers serving the UEs $102_{1-N}$ that are being served by the relay DU 320, as well as multiplexed packets from the backhaul communication between the relay DU 320 and the donor DU 310. Again, as noted above, the same spectrum is being used for both backhaul and access links, and as such, an IAB link can employ different multiplexing schemes to allow for UL and DL transmissions using the backhaul and access links.

Figure 5:
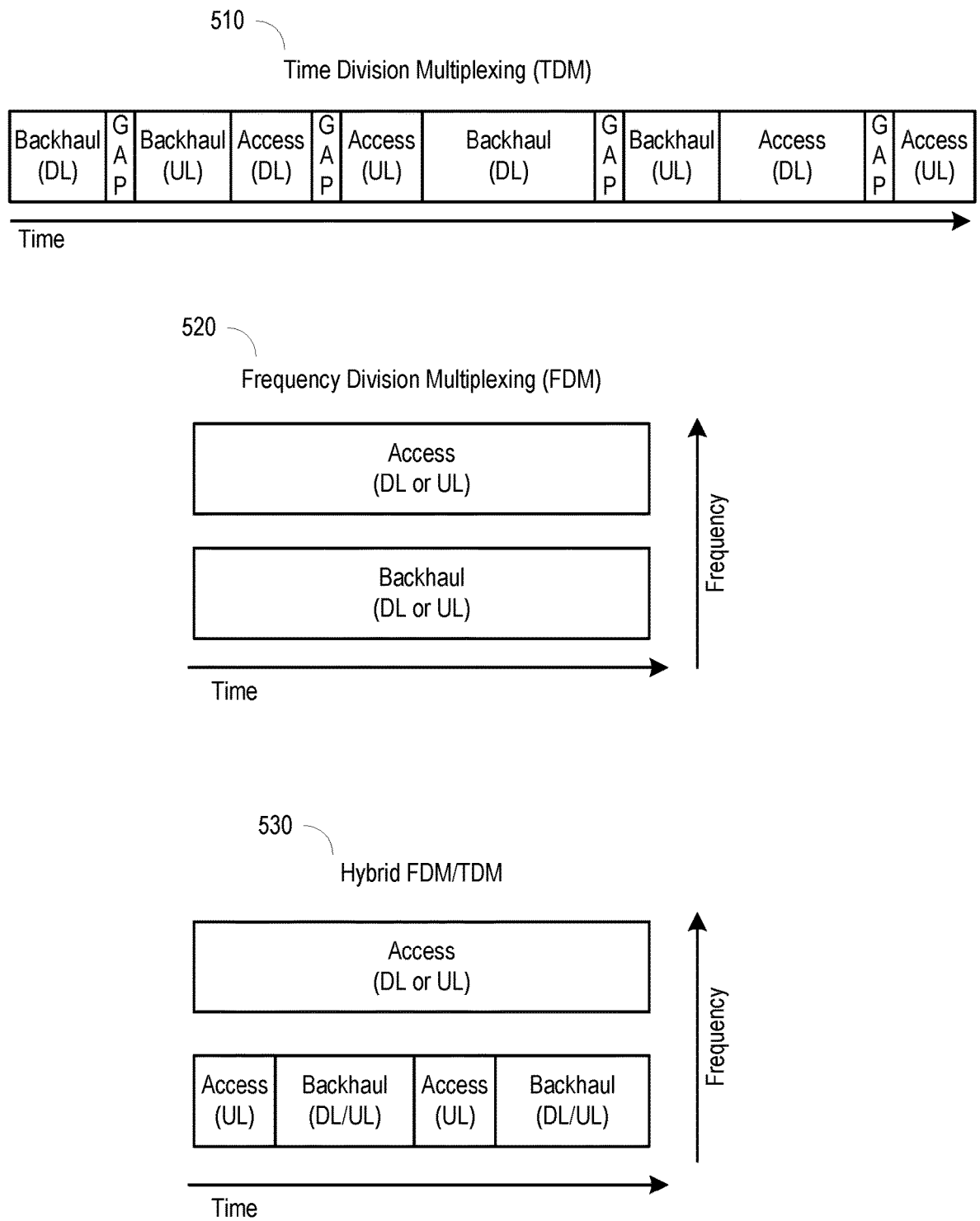
FIG. 5 illustrates examples of multiplexing schemes for IAB transmissions, in accordance with various aspects and example embodiments of the subject application.

FIG. 5 shows examples of transmissions employing time division multiplexing (TDM) 510, frequency division multiplexing (FDM) 520, and hybrid FDM/TDM 530 to integrate backhaul (in-band or out of band) and access link transmissions. In the example transaction illustrating TDM 510, backhaul downlink (e.g., backhaul DL), backhaul uplink (e.g., backhaul UL), access downlink (e.g., access DL), and access uplink (e.g., access UL) transmissions can occur at different times on the same frequency (guard intervals in between transmission slots can also be employed, denoted by the label GAP). Frequency division multiplexing (FDM) 520 schemes can also be employed, whereby UL and DL transmissions on the access link are made on one frequency, and UL and DL transmissions on the backhaul link are made on another frequency, thereby allowing the transmissions to occur at the same time. Still referring to FIG. 5, in the example illustrating hybrid FDM/TDM 530, UL and DL access transmissions can be transmitted on one frequency, while other access and backhaul UL and DL transmissions with assigned time slots are transmitted on another frequency. While not shown in FIG. 5, in addition to time and frequency, the transmissions can also be multiplexed in space. Beamforming and directional transmissions can allow for transmissions in the same frequency and time, but directed spatially in a different direction or magnitude, so as to reduce interference.

Figure 6:
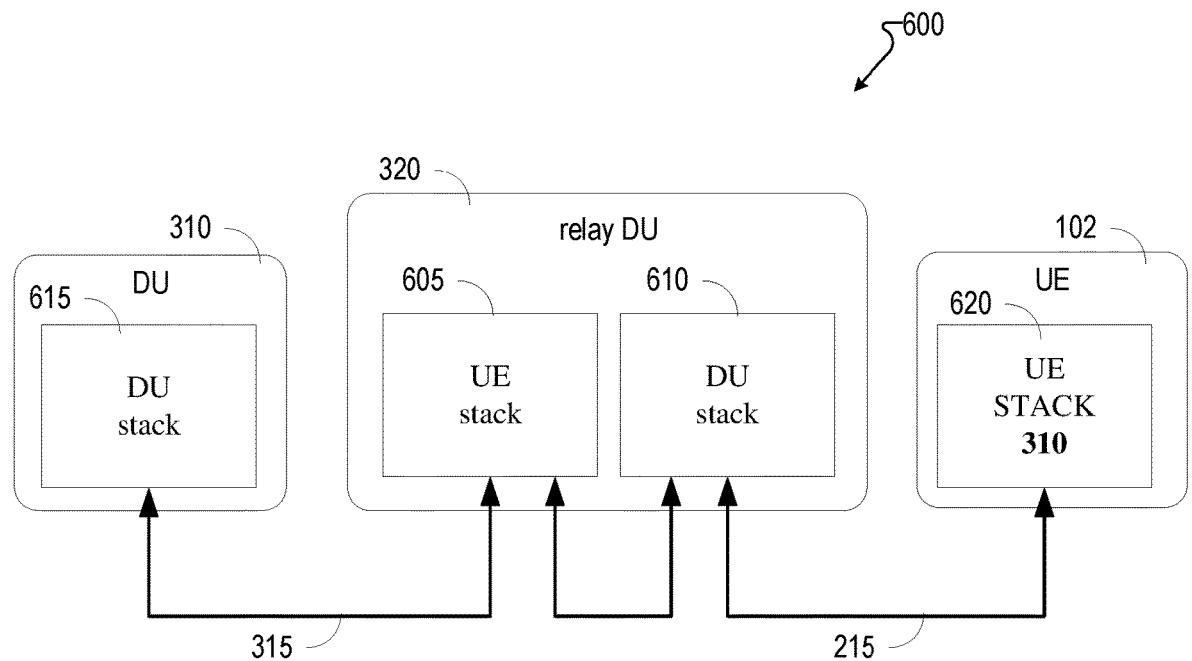
FIG. 6 illustrates an example block diagram of a relay DU with user equipment and DU stacks, in accordance with various aspects and example embodiments of the subject application.

Turning now to FIG. 6, illustrated is an example block diagram 600 of a relay DU (e.g., relay DU 320) with UE and DU stacks, in accordance with various aspects and example embodiments of the subject application. As mentioned above, the communications link between the DU (e.g., donor DU 310) and the relay DU (e.g., relay DU 320) can be referred to as a backhaul link (e.g., backhaul link 315), while the communications link between the relay DU and the UE (e.g., UE 102) can be referred to as an access link (access link 215).

In example embodiments, a relay DU can have separate logical functions that are co-located (e.g., functions performed by separate modules within the relay DU). A UE function (UE-f) can establish communications with the donor DU, and a DU function (DU-f) can establish communications with the UEs (e.g., child nodes). The logical functions can be performed by different stacks within the relay DU.

A UE stack 605 can support the UE-f, and a DU stack 610 can support the DU-f. The relay DU contains both the UE stack and DU stack on the same hardware—essentially, the relay DU acts as a virtual UE, and also acts as a virtual DU. A UE sees the relay DU as a DU, but the donor DU sees the relay DU as just another UE.

Thus, to a donor DU (e.g., donor DU 310), the relay DU appears as a UE, as the UE stack 605 acts to facilitate the relay DU's functioning as a UE to a DU, communicating with the DU stack 615 of a DU (e.g., donor DU 310). To a UE (e.g., UE 102), the relay DU appears as a DU. The DU stack 610 of the relay DU 320 acts to facilitate the relay DU's functioning as a DU to the UE, interacting with the UE stack 620 of the UE.

In example embodiments, even though the relay DU 320 comprises two logical nodes, each with its own stack, the physical transceiver of the relay DU 320 is shared between them. In other words, the PHY layer of the UE stack 605 and the PHY layer of the DU stack 610 operate on the same transceiver system. The backhaul link and the access link can therefore be multiplexed using a multiplexing scheme, some examples of which were described above in FIG. 5.

With respect to time division multiplexing (TDM), the access link and the backhaul link are time multiplexed with each other. This implies that UE stack 605 and the DU stack 610 are not active simultaneously. With regard to frequency division multiplexing (FDM), the access link and the backhaul link are active at the same time but on different frequency resources (e.g. on a separate cellular component (CC), or on a separate physical resource block (PRB) on the same cellular component (CC). With respect to spatial division multiplexing (SDM), the access link and the backhaul link are active at the same time on the same frequency resources. The spatial multiplexing can further be divided into the two following cases: a) intra-panel SDM, wherein the access and backhaul links use the same panel but different spatial layers, and b) inter-panel SDM, wherein the access and backhaul links use different panels. In example embodiments, the power control management system and methods disclosed herein can be applicable to various cases of access and backhaul multiplexing schemes.

Figure 7:
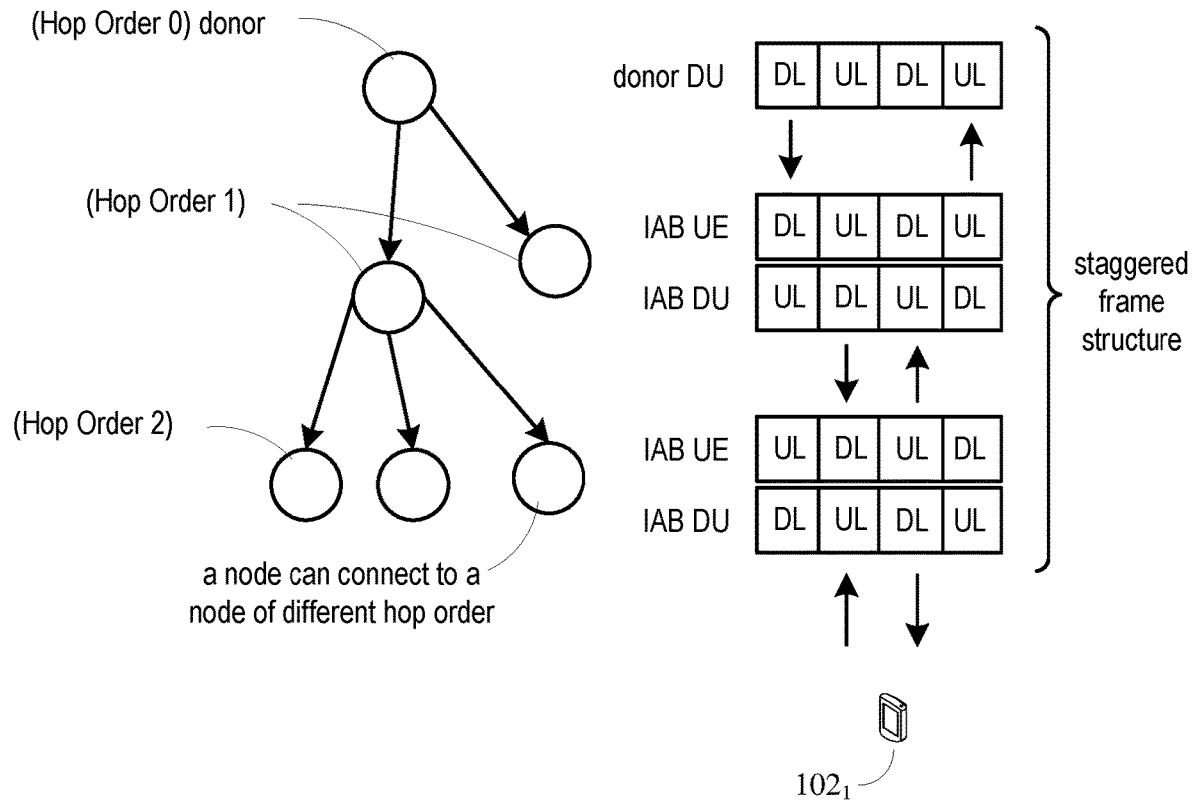
FIG. 7 illustrates a tree diagram depicting an example of DUs having different hop orders, and corresponding frame structures for IAB transmission, in accordance with various aspects and example embodiments of the subject application.

Referring now to FIG. 7, due to the half-duplex constraint at each relay DU, the relay DU can transmit or receive at any given instance, but not both. The UE's UE-f PHY can be in receive mode during a backhaul DL allocation and in transmit mode during a backhaul UL allocation. Similarly, the DU-f PHY can be in receive mode during an access UL allocation and in transmit mode during an access DL allocation. This implies that the frame structure across multiple hops can be staggered, as shown in FIG. 7. Based on the half duplex constraint when the access and backhaul are multiplexed at the same time (e.g., FDM or SDM) then the following combinations can result: PHY receive: backhaul DL and access UL are FDM or SDM; PHY transmit: backhaul UL and access DL are FDM or SDM.

Figure 8:
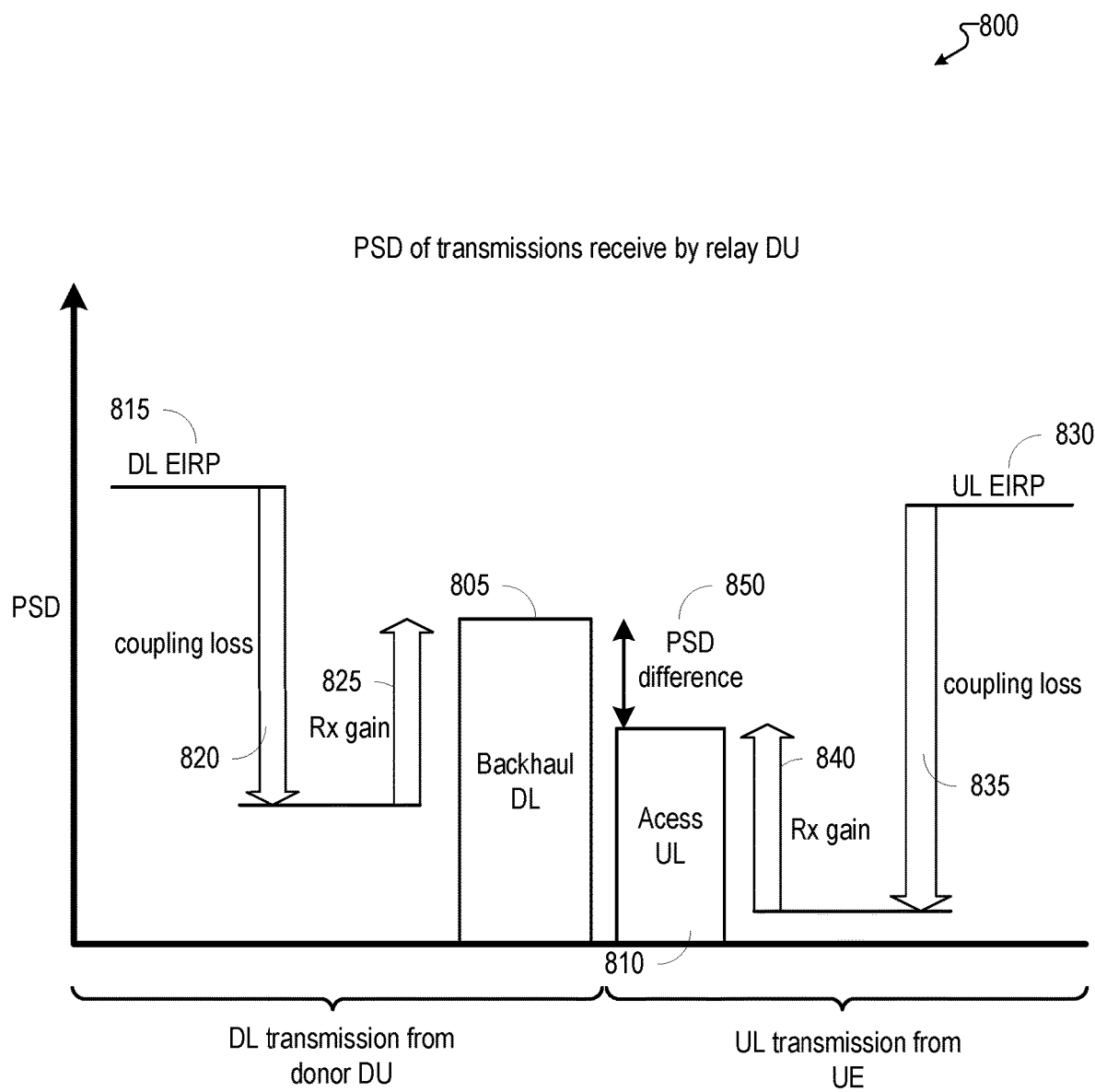
FIG. 8 illustrates an example graph showing power spectral density differences in backhaul downlink (DL) and access uplink (UL) transmissions received by a relay DU, in accordance with various aspects and example embodiments of the subject application.

FIG. 8 illustrates an example graph showing power spectral density (PSD) differences at a relay DU receiver for backhaul and access link communications, in accordance with various aspects and example embodiments of the subject application. Since a DL and UL are multiplexed across access and backhaul links, power control can be very significant. In 5G/NR, the transmit and receive power levels of DL channels and UL channels can be very different. For example, when the relay DU PHY is in receive mode, then it must receive the backhaul DL transmissions and the access UL transmissions at the same time (e.g., using FDM or SDM). In this case, the DL backhaul transmission is performed by the DU-f of the donor DU (e.g., donor DU 310), whereas the UL access transmission is performed by a UE-f of a child node (e.g., UE 102). The Equivalent Isotropically Radiated Power (EIRP) of DL transmissions from a DU to a UE is typically much higher than the EIRP of the UL transmissions of a UE to the DU. Moreover, in NR the UL transmissions are power controlled by the relay DU, whereas DL transmissions are not controlled by the relay DU. The result is that the backhaul DL transmissions from a donor DU, and access UL transmission from a UE, will arrive at the receiver of the relay DU at very different power levels, as shown in FIG. 8. If the hardware is shared between the UE-f and DU-f (e.g. same panel or same RF chain) then such a receiver PSD difference can cause significant problems.

In FIG. 8, the vertical axis of the graph 800 can be the power spectral density axis. A DL transmission from a donor DU (e.g., donor DU 310) can have a resultant backhaul DL power spectral density 805, and a UE can have an UL transmission that has a resultant access UL power spectral density of 810. The initial downlink EIRP 815 of the backhaul DL transmission from the donor DU can be higher than the backhaul DL power spectral density 805, but there is coupling loss 820, which drops the power level, and then there can be an increase in the power after amplification by an amplifier (represented as receiver (Rx) gain 825). Similarly, the initial UL EIRP 830 of an access UL transmission can suffer coupling loss 835, followed by a Rx gain 840, resulting in an access UL power spectral density 810. The difference between the power spectral densities is PSD difference 850, which can be a significant difference, and may be above a difference threshold that can initiate the power control management disclosed herein.

As mentioned, if the hardware is shared between the UE-f and DU-f (e.g. same panel or same RF chain) then such a receiver PSD difference can cause significant problems. The higher PSD of the DL backhaul will likely set the automatic gain control (AGC) which implies that the UL access signal will fall well below the level set by AGC, which can significantly impact the signal to noise ration (SINR) and therefore the overall throughput of the access transmission.

The disparity in PSD can also result in noise due to processing by a relay DU's analog-to-digital converter. To accurately convert the RF signals from analog to digital, the signals must be sampled by the relay DU, e.g., using an analog-to-digital converter to sample it into digital numbers. Those analog-to-digital converters must operate at a particular level. For example, the analog to digital converter can covert signals of plus or minus one volt into digital numbers. If the voltage from the donor DU via the backhaul DL is at plus or minus one volt, but the voltage coming from a UE's access UL signal is being received at plus or minus 0.1V (or lower), the analog-to-digital converter of the relay DU must convert a plus or minus 1 volt signal on one frequency, but on the other frequency, convert a plus or minus 0.1V (or even lower) signal, so it is not as accurate or sensitive at those frequencies for the access UL transmissions from the UE, resulting in higher noise (e.g., higher quantization noise), and those issues can start to impact performance. Ideally, the power of the signals coming into the analog-to-digital converter should roughly at the same level to mitigate this noise impact.

To support FDM and SDM using the same RF (e.g. intra panel), a power control mechanism for IAB, as discussed in the subsequent sections below, can be employed, whereby a power control adjustment is determined by a relay distributed unit device, based on a measurement of the power level of received access UL transmissions, and a measurement of the power level of a reference signal received from a donor DU via a backhaul DL transmission. The power control adjustment is transmitted to the donor distributed unit device, which uses the power control adjustment to reduce the amount of power of DL transmissions to the relay distributed unit device.

To facilitate the equalization of the PSD of the backhaul DL transmissions and the access UL transmissions at the receiver in the relay DU, a closed loop power control mechanism (e.g., process, operation) for DL transmission can be employed. In the prior art, the DL power control in NR is transparent to the UE, and there is no mechanism for the UE to send power control commands to the network. Example embodiments and aspects in accordance with the present application address this PSD differential by using the power control mechanism on access and backhaul links to mitigate the cross-link interference (CLI). In this context, cross link interference is the interference between the DU-f of two relay nodes or between the UE-f of two relay nodes. The power control mechanism can also be an effective mechanism to cope up with link degradation due to CLI.

Figure 9:
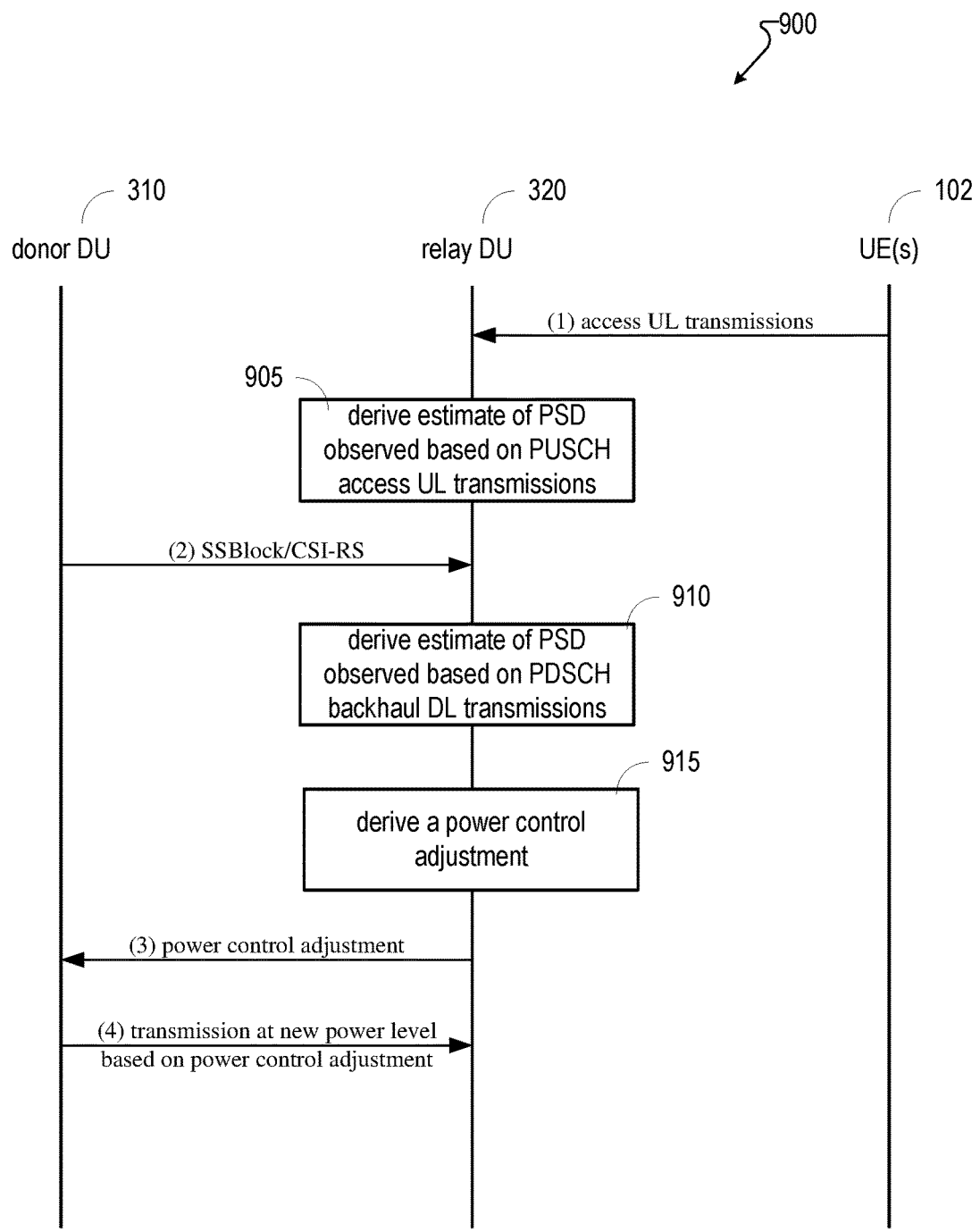
FIG. 9 illustrates a message sequence diagram illustrating example embodiments of a process for managing power level transmissions in a multi-hop IAB network, in accordance with various aspects and example embodiments of the subject application.

FIG. 9 depicts a message sequence diagram 900 depicting a power control mechanism, in accordance with aspects and example embodiments of the application. A closed-loop DL power control mechanism can be implemented with the following operation.

At sequence (1), a relay DU (e.g., relay DU 320) receives access UL transmissions from one or more UEs (e.g., UE $102_{1-N}$). At process block 905, based on the UL access allocation, the DU-f of a relay DU can derive an estimate of the PSD it observes on the transmissions, which can comprise physical uplink shared channel (PUSCH) transmissions from access UL transmissions from the UE. Put another way, the relay DU is constantly receiving UL transmissions from other devices, so it can observe power measurements of the UL signals and use those measurements to determine a projection, or estimation, the PSD of upcoming UL transmissions from UEs.

At sequence (2), a donor DU 310 can transmit to the relay DU a reference signal, such as a synchronization signal block (SSBlock), or a channel state information reference signal (CSI-RS). The relay donor can receive this reference signal. At process block 910, based on the reference signal's received signal reference power (RSRP) measurements and previous power control commands, the UE-f of the relay can derive an estimate of the PSD it observes on the physical downlink shared channel (PDSCH) transmission from the DL transmissions from a DU on the backhaul. Put another way, the relay DU is constantly receiving DL transmissions from donor DUs, so it can observe power measurements of the UL signals, and use those measurements to determine a projection, or estimation, the PSD of upcoming DL transmissions from donor DUs.

At process block 915, in example embodiments, the relay DU can be operable to derive a power control adjustment. The power control adjustment can be indicative of an estimated difference between the PSD associated with the backhaul DL transmissions from the donor DU, and the access UL transmissions from the UEs. The power control adjustment can be used by the donor DU's DU-f for adjusting the amount of power used when transmitting DL transmissions on backhaul transmissions (e.g., the backhaul PDSCH being measured by the relay DU). At sequence (3), the power control adjustment is signaled back to the donor DU. The power control adjustment is sent along with identifying information that identifies the relay DU (e.g., address information).

In response to receiving the power control adjustment, and using the identifying information, the donor DU adjusts the power at which DL transmissions to the relay DU is being transmitted, and at sequence (4), sends transmissions to the relay DU at the new power level, based on the power control adjustment. Of note, the donor DU services many other UE devices, so it maintains the power levels for downstream transmissions to other UE devices, but adjusts the power for transmissions going to the relay DU that provided the power control adjustment.

To illustrate, as an example, a donor DU sends a reference signal (e.g., SSblock, or CSI-RS). The relay DU can receive and measure the power of the incoming reference signal, and determines that the power is being received at 10 dB (decibels) higher than the power of all the other UE's UL transmissions (e.g., it can be an average power), so, based on an average power, the relay DU is able to estimate the power received from a typical UE access UL transmission, and determine a power control adjustment value. For example, the relay DU might determine the power control adjustment to be 10 decibels (dB). The relay DU can report the 10 dB value to the donor DU, which can be taken by the donor DU as a request to back off on the power of the DL transmissions to the relay by 10 DB.

Figure 10:
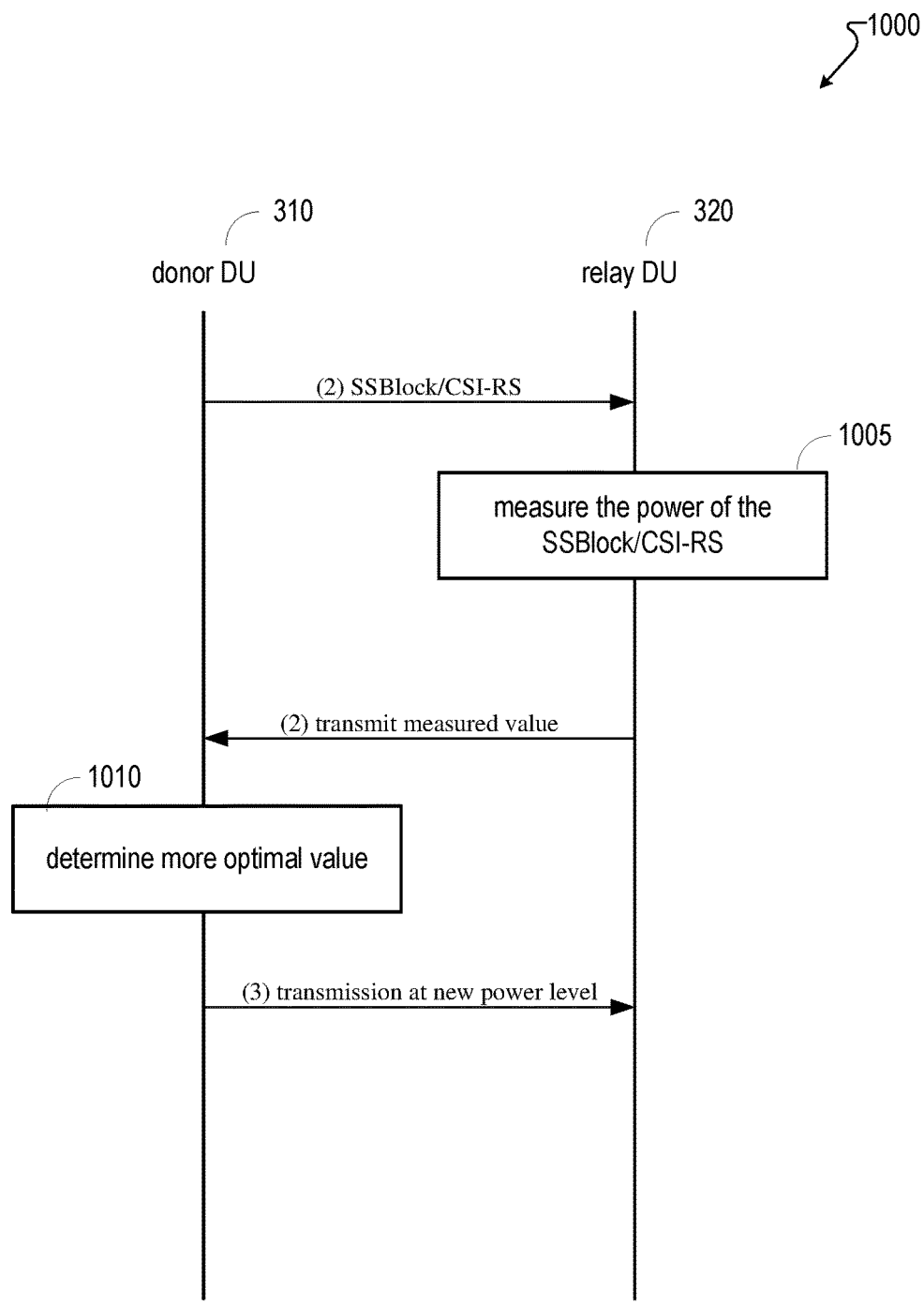
FIG. 10 illustrates another message sequence diagram illustrating example embodiments of a process for managing power level transmissions in a multi-hop IAB network, in accordance with various aspects and example embodiments of the subject application.

In FIG. 10, in example embodiments, the relay can receive the SSblock (e.g., a CSI-RS) at sequence (1), measure the power of the SSblock (e.g., 10 dB) at process block 1005, and provide that measured value as the feedback to the donor DU at sequence (2). Then the donor DU, when it receives the message that the relay is receiving at 10 dBm, can, at process block 1010, be operable to determine that the more optimal value of the transmitted power should be lower, and the donor DU will back off (e.g., reduce) the transmitted power by an appropriate amount (e.g., back it off by 9 dB). It can make this determination based on a stored value (e.g., 1 dB) stored in a memory of the DU reflective empirical measured values from access UL transmission measurements made by multiple relay DUs. As an example, the stored value can be placed into a memory of the donor DU, which need not have been transmitted from the relay DU, but may have been programmed into the donor DU, or received and stored via a wireless transmission, such as a software or information update. Thus, the measured value can be used as the power control adjustment value.

In addition, in example embodiments, the relay DU may adapt the power control adjustment based on the estimated interference experienced on either the access or backhaul links. The interference may be derived based on the channel state information (CSI) feedback or cross link (CL) measurement made at the relay DU, or reported by UEs or child relay nodes.

Figure 11:
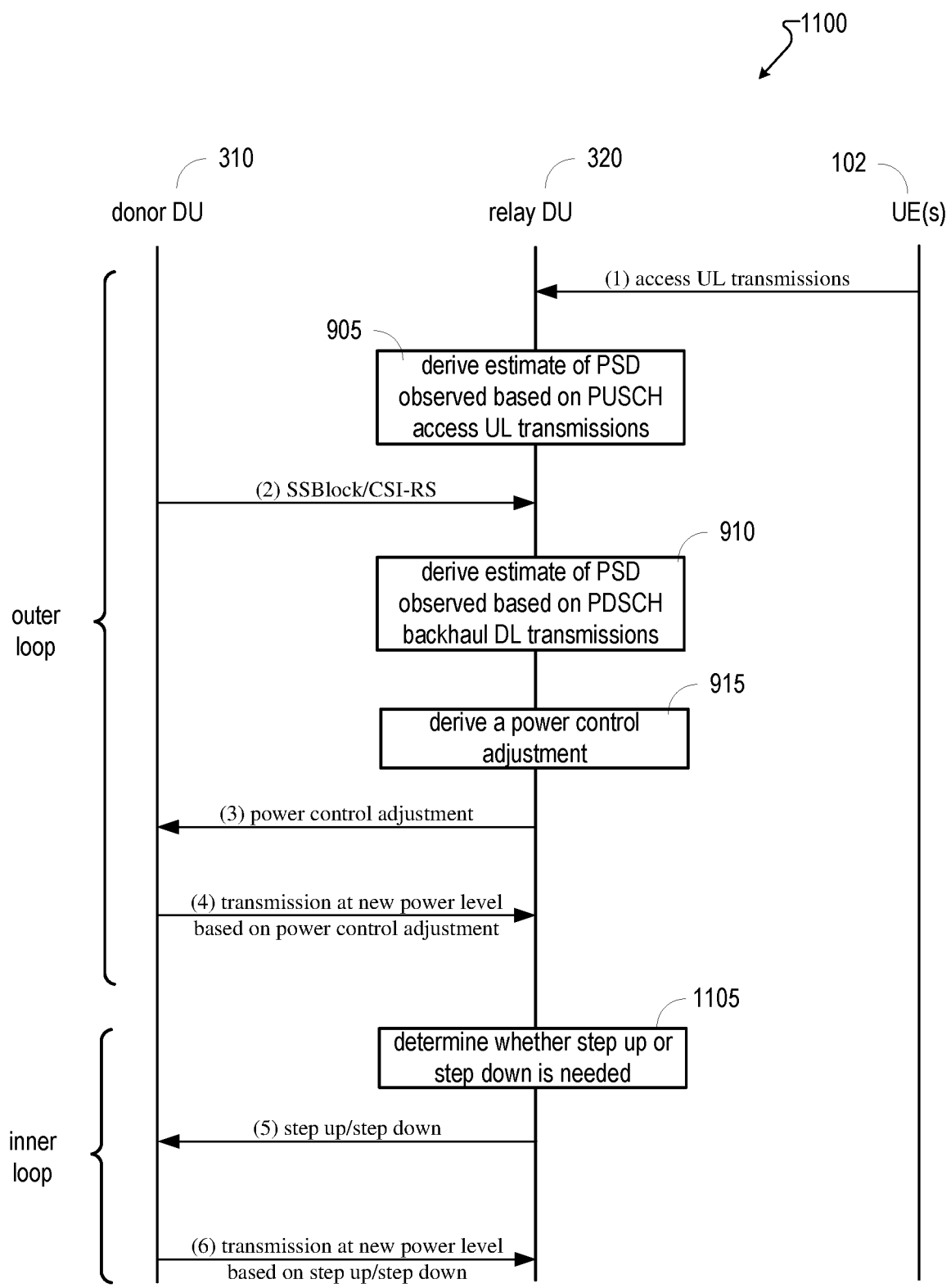
FIG. 11 illustrates another message sequence diagram illustrating example embodiments of a process for managing power level transmissions in a multi-hop IAB network comprising an outer loop aspect, and an inner loop aspect, in accordance with various aspects and example embodiments of the subject application.

In example embodiments, as shown in FIG. 11, the signaling of the closed loop power control from the UE-f of the relay node to the DU-f of the parent node can comprise the following two aspects: 1) an outer loop power control and 2) an inner loop power control.

The outer loop can function similarly to FIG. 9. With regard to the outer loop power control, the outer loop of the DL power control sets the operating point and can be specified as a relative value with respect to power measurements of a reference signal (such as SSBlock or CSI-RS), which are used for both radio resource management (RRM) and beam management measurements. In one embodiment the outer-loop power control adjustment determined at process block 915 of FIG. 11, is a single value of power setting (relative to a reference signal such as SSBlock or CSI-RS). At sequence (3) of FIG. 11, this single value can be sent using via, for example, the MAC layer control element (MAC-CE). In other example embodiments the outer loop power control messages can be a set of values of power setting (which can also be relative to the reference signal such as SSBlock or CSI-RS). This set of values can be sent via, for example, a radio resource control (RRC) message or the MAC-CE.

The inner loop power control provides further adjustments/selection to the value set by the outer loop. In example embodiments, the inner loop operates as a step up and step down command relative to the value set by the outer loop. The relay DU can, at process block 1105, determine whether a step up or step down in the power of the donor DU's transmissions is required. Then, the inner loop power control adjustment command can be sent via the physical uplink control channel (PUCCH) for fast feedback, as represented by sequence (5) of FIG. 11. The relay DU can be configured so as to provide feedback power control steps (e.g., an incremental power control adjustment) every slot along with other feedback on, for example the PUCCH, along with other such parameters as hybrid automatic repeat request (HARQ) positive-acknowledgement/negative-acknowledgement (e.g., HARQ ACK/NACK). In other example embodiments the inner loop selects one power level from the set of values set by the outer loop. The inner loop power level selection command can be sent via PUCCH, for fast PUCCH, as frequently as every slot along with other feedback on PUCCH such as HARQ ACK/NACK. At sequence (6) a backhaul DL transmission is sent to the relay DU with power levels reflective of the incremental power control adjustment (e.g., stepped up or stepped down).

Figure 12:
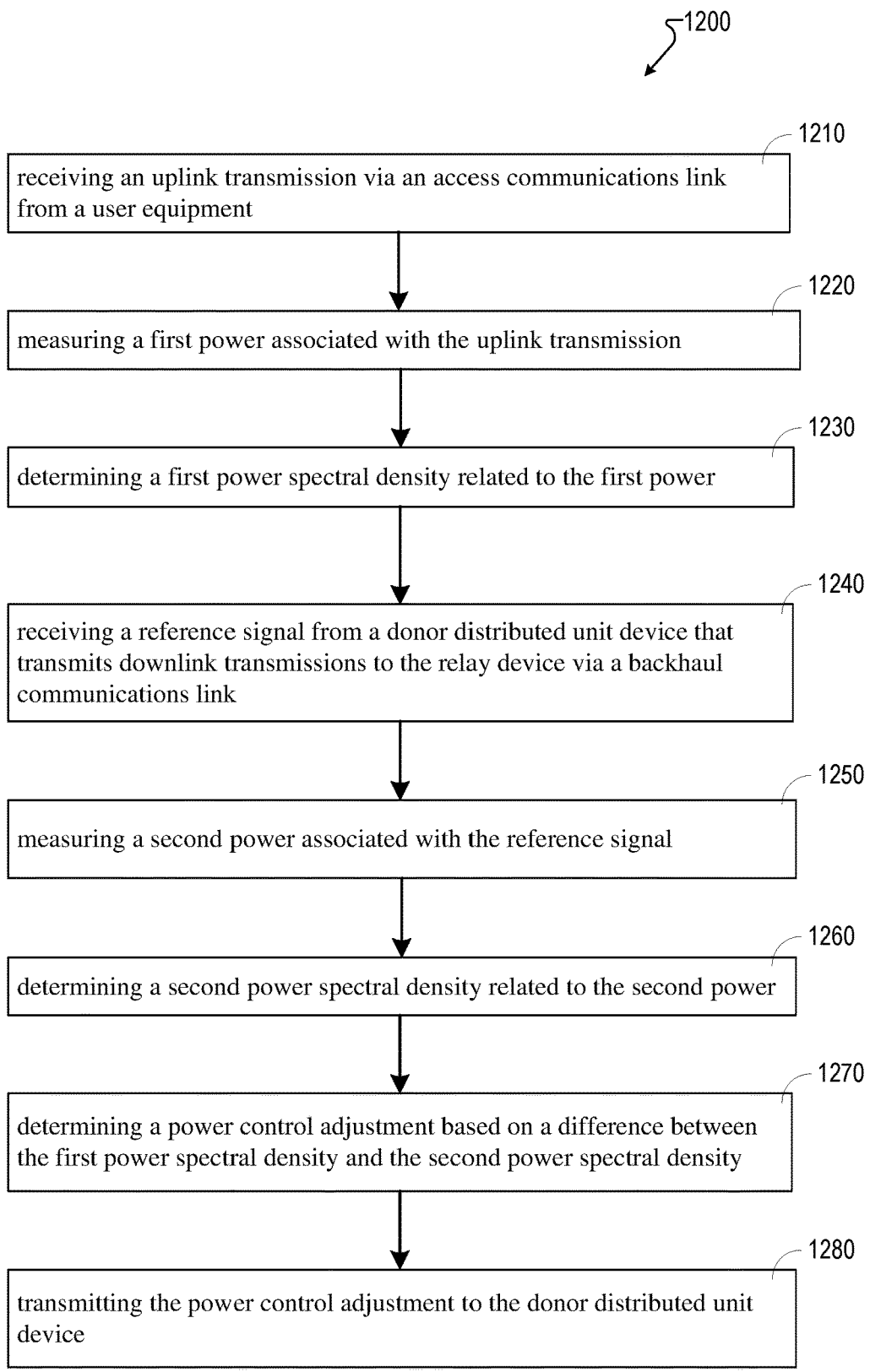
FIG. 12 illustrates an example method for managing power levels in a multi-hop IAB network that can be performed by a relay DU, in accordance with various aspects and example embodiments of the subject application.

FIG. 12 illustrates a flow diagram of operations that can be performed, for example, by a relay DU device (e.g., relay DU 320), in accordance with example embodiments of the subject application.

At block 1210, the operations can comprise receiving an uplink transmission via an access communications link (e.g., access link 215) from a user equipment (e.g., UE 102).

At block 1220, the operations can comprise measuring a first power associated with the uplink transmission. The uplink transmission can comprise, for example, a physical uplink shared channel (PUSCH) transmission that is used for scheduling uplink transmissions from the user equipment.

At block 1230, the operations can comprise determining a first power spectral density related to the first power (e.g., access UL power spectral density of 810).

At block 1240, the operations can comprise receiving a reference signal from a donor distributed unit device (e.g., donor DU 310) that transmits downlink transmissions to the relay device via a backhaul communications link (e.g., backhaul link 315). The reference signal can be, for example, a synchronization signal block (SSblock). The reference signal can be, for example, a channel state information reference signal (CSI-RS).

At block 1250, the operations can comprise measuring a second power associated with the reference signal. The second power can comprise a received signal reference power representative of a power measurement associated with the reference signal.

At block 1260, the operations can comprise determining a second power spectral density related to the second power (e.g., backhaul DL power spectral density 805).

At block 1270, the operations can comprise determining a power control adjustment based on a difference between the first power spectral density and the second power spectral density (e.g., PSD difference 850).

At block 1280, the operations can comprise transmitting the power control adjustment to the donor distributed unit device. The transmitting the power control adjustment can comprise transmitting identifying information that identifies the relay device. This identifying information can be used by the donor distributed unit device to adjust the power level of subsequent downlink transmissions to the relay node, while maintaining the power levels (e.g., keeping with the current scheme for transmitting) of other downlink transmissions to other UEs.

The operations can further comprise receiving a downlink transmission from the donor distributed unit device via the backhaul communications link, and wherein a power level of the downlink transmission is reflective of the power control adjustment. Further, a third power spectral density associated with the downlink transmission is less dense than the second power spectral density (e.g., has a lower value than the value of the second power spectral density).

Figure 13:
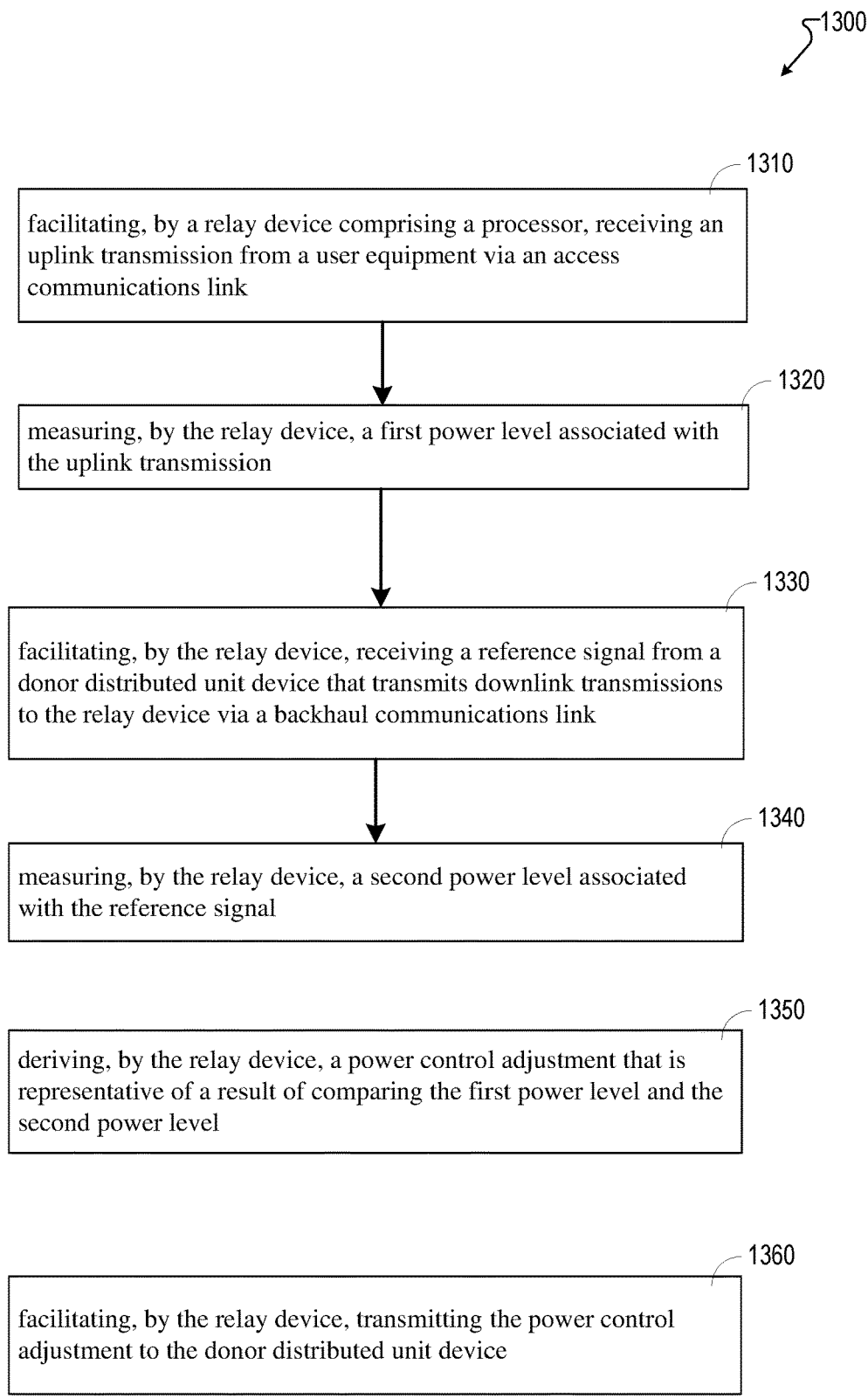
FIG. 13 is another illustration of an example method for managing power levels in a multi-hop IAB network that can be performed by a relay DU, in accordance with various aspects and example embodiments of the subject application.

FIG. 13 illustrates another flow diagram of operations that can be performed, for example, by a relay DU device (e.g., relay DU 320), in accordance with example embodiments of the subject application.

At block 1310, the operations can comprise facilitating, by a relay device comprising a processor (e.g., relay DU 320), receiving an uplink transmission from a user equipment (e.g., UE 102) via an access communications link (e.g., access link 215).

At block 1320, the operations can comprise measuring, by the relay device, a first power level associated with the uplink transmission (e.g., access UL power spectral density of 810).

At block 1330, the operations can comprise facilitating, by the relay device, receiving a reference signal from a donor distributed unit device (e.g., donor DU 310) that transmits downlink transmissions to the relay device via a backhaul communications link (e.g., backhaul link 315). The reference signal can be, for example, a synchronization signal block (SSblock). The reference signal can be, for example, a channel state information reference signal (CSI-RS).

At block 1340, the operations can comprise measuring, by the relay device, a second power level associated with the reference signal (backhaul DL power spectral density 805).

At block 1350, the operations can comprise deriving, by the relay device, a power control adjustment that is representative of a result of comparing the first power level and the second power level (e.g., PSD difference 850).

At block 1360, the operations can comprise facilitating, by the relay device, transmitting the power control adjustment to the donor distributed unit device. Facilitating the transmitting of the power control adjustment can comprise facilitating the transmitting of the power control adjustment via a radio resource control (RRC) message.

The operations can further comprise facilitating, by the relay device, receiving a downlink transmission from the donor distributed unit device via the backhaul communications link, wherein a third power level of the downlink transmission is representative of the power control adjustment, and wherein the downlink transmission is transmitted at the third power level that is lower than the second power level.

The operations can further comprise determining, by the relay device, whether a further power adjustment is to be performed based on a measurement of the third power level.

The method can further comprise, based on a determination that the further power adjustment is needed, facilitating, by the relay device, transmitting an incremental power control adjustment to the donor distributed unit device. The incremental power control adjustment can comprise facilitating the transmitting of the incremental power control adjustment on a physical uplink control channel (e.g., PUCCH) used to transmit control signals from the relay device to the donor distributed unit device.

Figure 14:
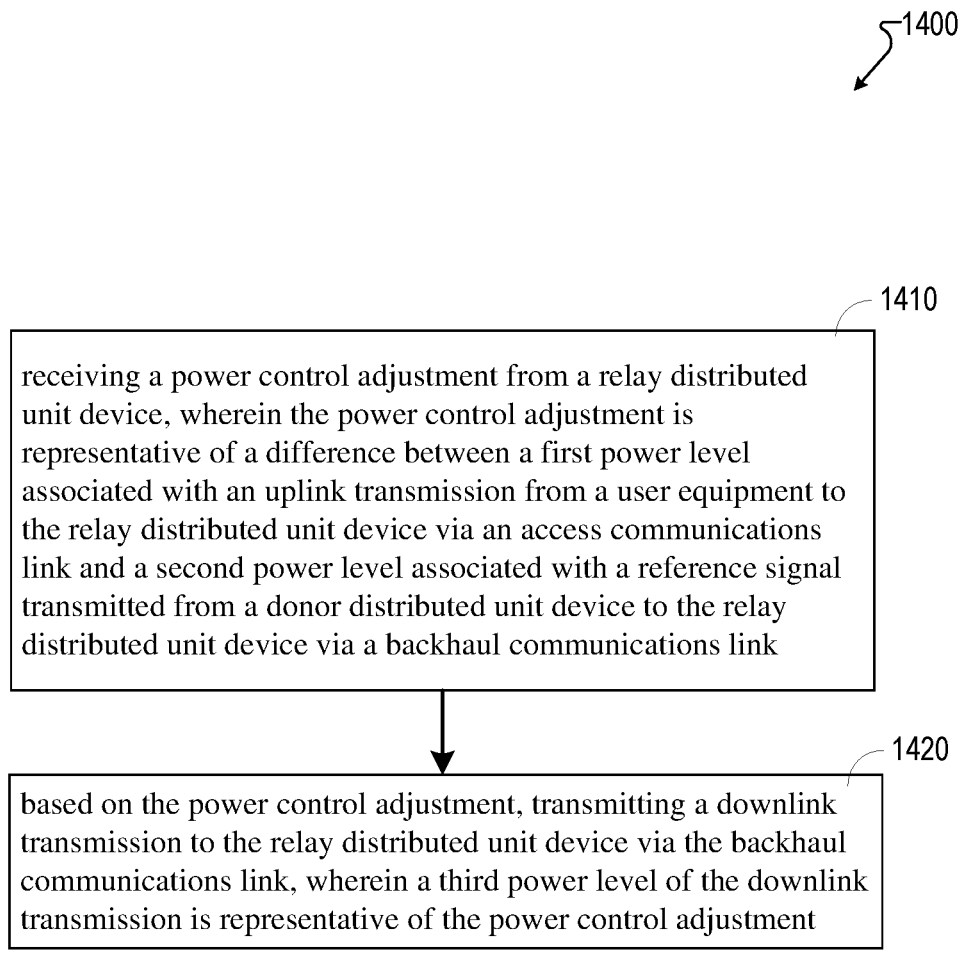
FIG. 14 illustrates another example method for managing power levels in a multi-hop IAB network that can be performed by a donor DU, in accordance with various aspects and example embodiments of the subject application.

FIG. 14 illustrates another flow diagram of operations that can be performed, for example, by a donor DU device (e.g., donor DU 310) in accordance with example embodiments of the subject application.

At block 1410, the operations can comprise, receiving a power control adjustment from a relay distributed unit device (e.g., relay DU 320), wherein the power control adjustment is representative of a difference (e.g., PSD difference 850) between a first power level associated with an uplink transmission from a user equipment (e.g., UE 102) to the relay distributed unit device via an access communications link (e.g., access link 215) and a second power level associated with a reference signal transmitted from a donor distributed unit device (e.g., donor DU 310) to the relay distributed unit device via a backhaul communications link (e.g., backhaul link 315). The reference signal can be, for example, a synchronization signal block (SSblock) that facilitates a synchronization of signals between the donor distributed unit device and the relay distributed unit device. The reference signal can be, for example, a channel state information reference signal (CSI-RS) used by receiving devices to provide channel state information feedback. The power control adjustment can be received via a physical upstream control channel (e.g., PUCCH) used to communicate control signals from the relay distributed unit device.

At block 1420, the operations can comprise, based on the power control adjustment, transmitting a downlink transmission to the relay distributed unit device via the backhaul communications link, wherein a third power level of the downlink transmission is representative of the power control adjustment.

The operations can further comprise receiving an incremental power control adjustment from the relay distributed unit device, and wherein the incremental power control adjustment is representative of a determination that a power adjustment is to be performed based on a measurement of the third power level.

Figure 15:
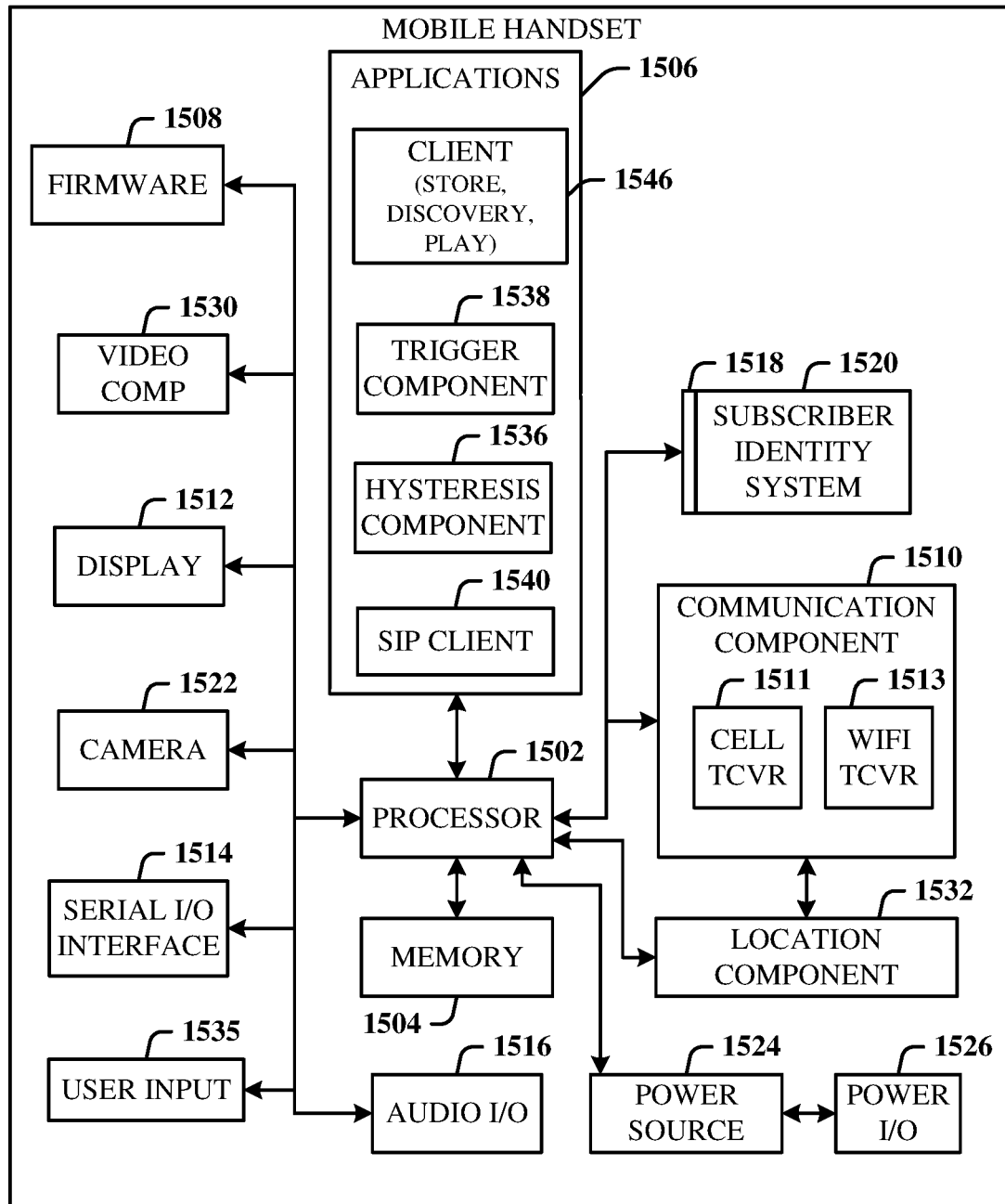
FIG. 15 illustrates an example block diagram of an example user equipment that can be a mobile handset, in accordance with various aspects and embodiments of the subject application.

Referring now to FIG. 15, illustrated is a schematic block diagram of an example end-user device such as a user equipment (e.g., UE 102) that can be a mobile device 1500 capable of connecting to a network in accordance with some embodiments described herein. Although a mobile handset 1500 is illustrated herein, it will be understood that other devices can be a mobile device, and that the mobile handset 1500 is merely illustrated to provide context for the embodiments of the various embodiments described herein. The following discussion is intended to provide a brief, general description of an example of a suitable environment in which the various embodiments can be implemented. While the description comprises a general context of computer-executable instructions embodied on a machine-readable storage medium, those skilled in the art will recognize that the embodiments also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, comprising single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and comprises both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and that can be accessed by the computer.

Communication media typically embodies computer-readable instructions, data structures, program modules or other data in a modulated data signal such as a carrier wave or other transport mechanism, and comprises any information delivery media. The term "modulated data signal" means a signal that has one or more of its characteristics set or changed in such a manner as to encode information in the signal. By way of example, and not limitation, communication media comprises wired media such as a wired network or direct-wired connection, and wireless media such as acoustic, RF, infrared and other wireless media. Combinations of the any of the above should also be included within the scope of computer-readable media.

The handset 1500 comprises a processor 1502 for controlling and processing all onboard operations and functions. A memory 1504 interfaces to the processor 1502 for storage of data and one or more applications 1506 (e.g., a video player software, user feedback component software, etc.). Other applications can include voice recognition of predetermined voice commands that facilitate initiation of the user feedback signals. The applications 1506 can be stored in the memory 1504 and/or in a firmware 1508, and executed by the processor 1502 from either or both the memory 1504 or/and the firmware 1508. The firmware 1508 can also store startup code for execution in initializing the handset 1500. A communications component 1510 interfaces to the processor 1502 to facilitate wired/wireless communication with external systems, e.g., cellular networks, VoIP networks, and so on. Here, the communications component 1510 can also include a suitable cellular transceiver 1511 (e.g., a GSM transceiver) and/or an unlicensed transceiver 1513 (e.g., Wi-Fi, WiMax) for corresponding signal communications. The handset 1500 can be a device such as a cellular telephone, a PDA with mobile communications capabilities, and messaging-centric devices. The communications component 1510 also facilitates communications reception from terrestrial radio networks (e.g., broadcast), digital satellite radio networks, and Internet-based radio services networks.

The handset 1500 comprises a display 1512 for displaying text, images, video, telephony functions (e.g., a Caller ID function), setup functions, and for user input. For example, the display 1512 can also be referred to as a "screen" that can accommodate the presentation of multimedia content (e.g., music metadata, messages, wallpaper, graphics, etc.). The display 1512 can also display videos and can facilitate the generation, editing and sharing of video quotes. A serial I/O interface 1514 is provided in communication with the processor 1502 to facilitate wired and/or wireless serial communications (e.g., USB, and/or IEEE 1394) through a hardwire connection, and other serial input devices (e.g., a keyboard, keypad, and mouse). This supports updating and troubleshooting the handset 1500, for example. Audio capabilities are provided with an audio I/O component 1516, which can include a speaker for the output of audio signals related to, for example, indication that the user pressed the proper key or key combination to initiate the user feedback signal. The audio I/O component 1516 also facilitates the input of audio signals through a microphone to record data and/or telephony voice data, and for inputting voice signals for telephone conversations.

The handset 1500 can include a slot interface 1518 for accommodating a SIC (Subscriber Identity Component) in the form factor of a card Subscriber Identity Module (SIM) or universal SIM 1520, and interfacing the SIM card 1520 with the processor 1502. However, it is to be appreciated that the SIM card 1520 can be manufactured into the handset 1500, and updated by downloading data and software.

The handset 1500 can process IP data traffic through the communication component 1510 to accommodate IP traffic from an IP network such as, for example, the Internet, a corporate intranet, a home network, a person area network, etc., through an ISP or broadband cable provider. Thus, VoIP traffic can be utilized by the handset 1500 and IP-based multimedia content can be received in either an encoded or decoded format.

A video processing component 1522 (e.g., a camera) can be provided for decoding encoded multimedia content. The video processing component 1522 can aid in facilitating the generation, editing and sharing of video quotes. The handset 1500 also comprises a power source 1524 in the form of batteries and/or an AC power subsystem, which power source 1524 can interface to an external power system or charging equipment (not shown) by a power I/O component 1526.

The handset 1500 can also include a video component 1530 for processing video content received and, for recording and transmitting video content. For example, the video component 1530 can facilitate the generation, editing and sharing of video quotes. A location tracking component 1532 facilitates geographically locating the handset 1500. As described hereinabove, this can occur when the user initiates the feedback signal automatically or manually. A user input component 1534 facilitates the user initiating the quality feedback signal. The user input component 1534 can also facilitate the generation, editing and sharing of video quotes. The user input component 1534 can include such conventional input device technologies such as a keypad, keyboard, mouse, stylus pen, and/or touch screen, for example.

Referring again to the applications 1506, a hysteresis component 1536 facilitates the analysis and processing of hysteresis data, which is utilized to determine when to associate with the access point. A software trigger component 1538 can be provided that facilitates triggering of the hysteresis component 1536 when the Wi-Fi transceiver 1513 detects the beacon of the access point. A SIP client 1540 enables the handset 1500 to support SIP protocols and register the subscriber with the SIP registrar server. The applications 1506 can also include a client 1542 that provides at least the capability of discovery, play and store of multimedia content, for example, music.

The handset 1500, as indicated above related to the communications component 1510, comprises an indoor network radio transceiver 1513 (e.g., Wi-Fi transceiver). This function supports the indoor radio link, such as IEEE 802.11, for the dual-mode GSM handset 1500. The handset 1500 can accommodate at least satellite radio services through a handset that can combine wireless voice and digital radio chipsets into a single handheld device.

Figure 16:
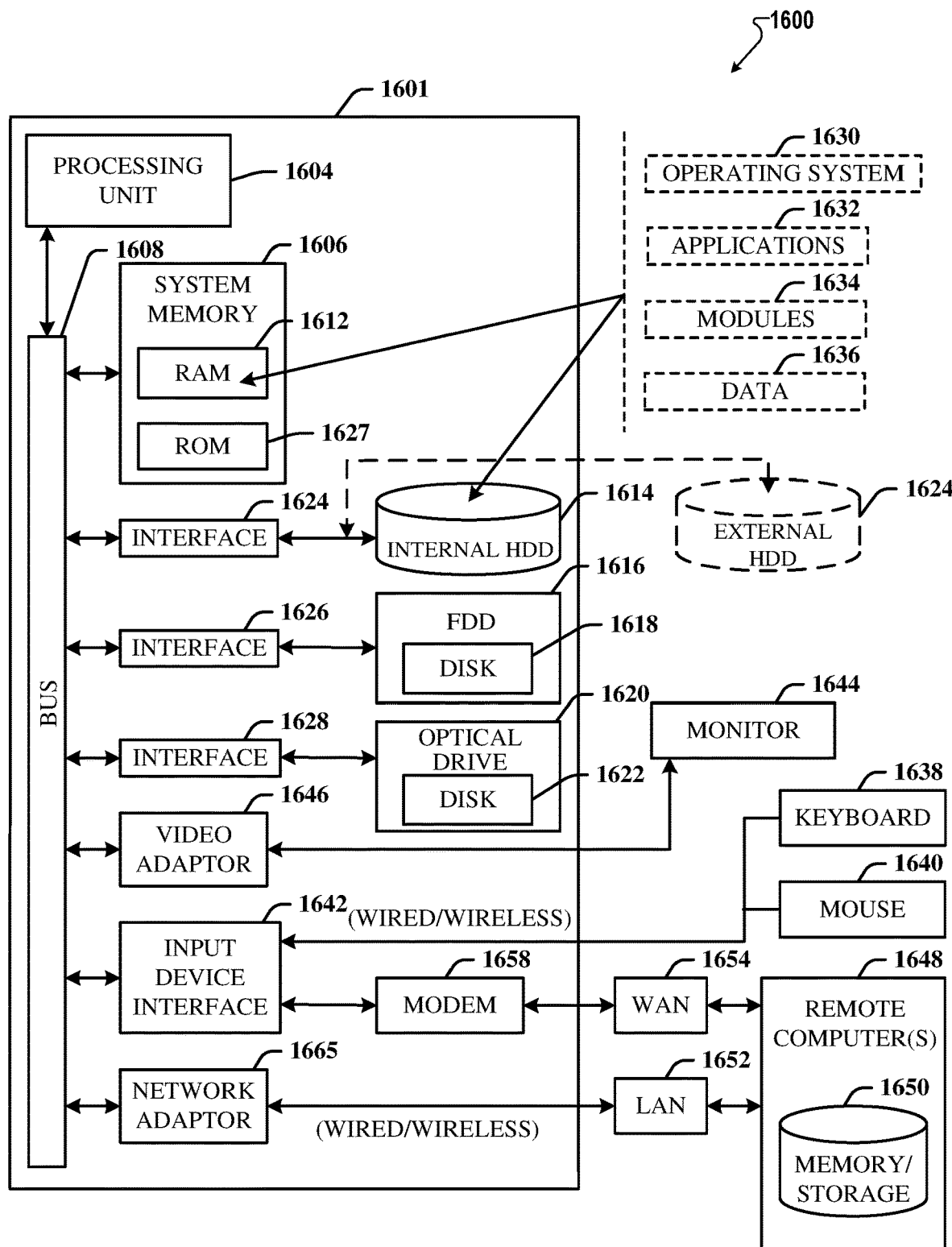
FIG. 16 illustrates an example block diagram of a computer that can be operable to execute processes and methods, in accordance with various aspects and embodiments of the subject application.

Referring now to FIG. 16, there is illustrated a block diagram of a computer 1600 operable to execute the functions and operations performed in the described example embodiments. For example, donor and relay devices can contain components as described in FIG. 16. The computer 1600 can provide networking and communication capabilities between a wired or wireless communication network and a server and/or communication device. In order to provide additional context for various aspects thereof, FIG. 16 and the following discussion are intended to provide a brief, general description of a suitable computing environment in which the various aspects of the embodiments can be implemented to facilitate the establishment of a transaction between an entity and a third party. While the description above is in the general context of computer-executable instructions that can run on one or more computers, those skilled in the art will recognize that the embodiments also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the embodiments can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 16, implementing various aspects described herein, devices can include a computer 1600, the computer 1600 comprising a processing unit 1604, a system memory 1606 and a system bus 1608. The system bus 1608 couples system components comprising the system memory 1606 to the processing unit 1604. The processing unit 1604 can be any of various commercially available processors. Dual microprocessors and other multi-processor architectures can also be employed as the processing unit 1604.

The system bus 1608 can be any of several types of bus structure that can further interconnect to a memory bus (with or without a memory controller), a peripheral bus, and a local bus using any of a variety of commercially available bus architectures. The system memory 1606 comprises read-only memory (ROM) 1627 and random access memory (RAM) 1612. A basic input/output system (BIOS) is stored in a non-volatile memory 1627 such as ROM, EPROM, EEPROM, which BIOS contains the basic routines that help to transfer information between elements within the computer 1600, such as during start-up. The RAM 1612 can also include a high-speed RAM such as static RAM for caching data.

The computer 1600 further comprises an internal hard disk drive (HDD) 1614 (e.g., EIDE, SATA), which internal hard disk drive 1614 can also be configured for external use in a suitable chassis (not shown), a magnetic floppy disk drive (FDD) 1616, (e.g., to read from or write to a removable diskette 1618) and an optical disk drive 1620, (e.g., reading a CD-ROM disk 1622 or, to read from or write to other high capacity optical media such as the DVD). The hard disk drive 1614, magnetic disk drive 1616 and optical disk drive 1620 can be connected to the system bus 1608 by a hard disk drive interface 1624, a magnetic disk drive interface 1626 and an optical drive interface 1628, respectively. The interface 1624 for external drive implementations comprises at least one or both of Universal Serial Bus (USB) and IEEE 1294 interface technologies. Other external drive connection technologies are within contemplation of the subject embodiments.

The drives and their associated computer-readable media provide nonvolatile storage of data, data structures, computer-executable instructions, and so forth. For the computer 1600 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1600, such as zip drives, magnetic cassettes, flash memory cards, cartridges, and the like, can also be used in the example operating environment, and further, that any such media can contain computer-executable instructions for performing the methods of the disclosed embodiments.

A number of program modules can be stored in the drives and RAM 1612, comprising an operating system 1630, one or more application programs 1632, other program modules 1634 and program data 1636. All or portions of the operating system, applications, modules, and/or data can also be cached in the RAM 1612. It is to be appreciated that the embodiments can be implemented with various commercially available operating systems or combinations of operating systems.

A user can enter commands and information into the computer 1600 through one or more wired/wireless input devices, e.g., a keyboard 1638 and a pointing device, such as a mouse 1640. Other input devices (not shown) can include a microphone, an IR remote control, a joystick, a game pad, a stylus pen, touch screen, or the like. These and other input devices are often connected to the processing unit 1604 through an input device interface 1642 that is coupled to the system bus 1608, but can be connected by other interfaces, such as a parallel port, an IEEE 2394 serial port, a game port, a USB port, an IR interface, etc.

A monitor 1644 or other type of display device is also connected to the system bus 1608 through an interface, such as a video adapter 1646. In addition to the monitor 1644, a computer 1600 typically comprises other peripheral output devices (not shown), such as speakers, printers, etc.

The computer 1600 can operate in a networked environment using logical connections by wired and/or wireless communications to one or more remote computers, such as a remote computer(s) 1648. The remote computer(s) 1648 can be a workstation, a server computer, a router, a personal computer, portable computer, microprocessor-based entertainment device, a peer device or other common network node, and typically comprises many, if not all of, the elements described relative to the computer, although, for purposes of brevity, only a memory/storage device 1650 is illustrated. The logical connections depicted include wired/wireless connectivity to a local area network (LAN) 1652 and/or larger networks, e.g., a wide area network (WAN) 1654. Such LAN and WAN networking environments are commonplace in offices and companies, and facilitate enterprise-wide computer networks, such as intranets, all of which can connect to a global communications network, e.g., the Internet.

When used in a LAN networking environment, the computer 1600 is connected to the local network 1652 through a wired and/or wireless communication network interface or adapter 1656. The adapter 1656 can facilitate wired or wireless communication to the LAN 1652, which can also include a wireless access point disposed thereon for communicating with the wireless adapter 1656.

When used in a WAN networking environment, the computer 1600 can include a modem 1658, or is connected to a communications server on the WAN 1654, or has other means for establishing communications over the WAN 1654, such as by way of the Internet. The modem 1658, which can be internal or external and a wired or wireless device, is connected to the system bus 1608 through the input device interface 1642. In a networked environment, program modules depicted relative to the computer, or portions thereof, can be stored in the remote memory/storage device 1650. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This comprises at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE802.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 5 GHz radio bands, at an 11 Mbps (802.11b) or 54 Mbps (802.11a) data rate, for example, or with products that contain both bands (dual band), so the networks can provide real-world performance similar to the basic "10BaseT" wired Ethernet networks used in many offices.

As used in this application, the terms "system," "component," "interface," and the like are generally intended to refer to a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. These components also can execute from various computer readable storage media comprising various data structures stored thereon. The components can communicate via local and/or remote processes such as in accordance with a signal comprising one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry that is operated by software or firmware application(s) executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. An interface can comprise input/output (I/O) components as well as associated processor, application, and/or API components.

Furthermore, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As it employed in the subject specification, the term "processor" can refer to substantially any computing processing unit or device comprising single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of UE. A processor also can be implemented as a combination of computing processing units.

In the subject specification, terms such as "store," "data store," "data storage," "database," "repository," "queue", and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory. In addition, memory components or memory elements can be removable or stationary. Moreover, memory can be internal or external to a device or component, or removable or stationary. Memory can comprise various types of media that are readable by a computer, such as hard-disc drives, zip drives, magnetic cassettes, flash memory cards or other types of memory cards, cartridges, or the like.

By way of illustration, and not limitation, nonvolatile memory can comprise read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

In particular and in regard to the various functions performed by the above described components, devices, circuits, systems and the like, the terms (comprising a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated example aspects of the embodiments. In this regard, it will also be recognized that the embodiments comprises a system as well as a computer-readable medium comprising computer-executable instructions for performing the acts and/or events of the various methods.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communications media comprise wired media, such as a wired network or direct-wired connection, and wireless media such as acoustic, RF, infrared and other wireless media Further, terms like "user equipment," "user device," "mobile device," "mobile," station," "access terminal," "terminal," "handset," and similar terminology, generally refer to a wireless device utilized by a subscriber or user of a wireless communication network or service to receive or convey data, control, voice, video, sound, gaming, or substantially any data-stream or signaling-stream. The foregoing terms are utilized interchangeably in the subject specification and related drawings. Likewise, the terms "access point," "node B," "base station," "evolved Node B," "gNodeB," "cell," "cell site," and the like, can be utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

Furthermore, the terms "user," "subscriber," "customer," "consumer," and the like are employed interchangeably throughout the subject specification, unless context warrants particular distinction(s) among the terms. It should be appreciated that such terms can refer to human entities, associated devices, or automated components supported through artificial intelligence (e.g., a capacity to make inference based on complex mathematical formalisms) which can provide simulated vision, sound recognition and so forth. In addition, the terms "wireless network" and "network" are used interchangeable in the subject application, when context wherein the term is utilized warrants distinction for clarity purposes such distinction is made explicit.

Moreover, the word "exemplary," where used, is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while a particular feature may have been disclosed with respect to only one of several implementations or embodiments, such feature can be combined with one or more other features of the other implementations as may be desired and advantageous for any given or particular application. Furthermore, to the extent that the terms "have", "having", "includes" and "including" and variants thereof are used in either the detailed description or the claims, these terms are intended to be inclusive in a manner similar to the term "comprising."

The above descriptions of various embodiments of the subject disclosure and corresponding figures and what is described in the Abstract, are described herein for illustrative purposes, and are not intended to be exhaustive or to limit the disclosed embodiments to the precise forms disclosed. It is to be understood that one of ordinary skill in the art can recognize that other embodiments comprising modifications, permutations, combinations, and additions can be implemented for performing the same, similar, alternative, or substitute functions of the disclosed subject matter, and are therefore considered within the scope of this disclosure. Therefore, the disclosed subject matter should not be limited to any single embodiment described herein, but rather should be construed in breadth and scope in accordance with the claims below.

What is claimed is:

1. A relay device, comprising:
    a processor; and
    a memory that stores computer executable instructions that, when executed by the processor, facilitate performance of operations, comprising:
        determining a first power spectral density related to a first power measurement related to an uplink transmission received from a user equipment via an access communications link;
        determining a second power spectral density related to a second power measurement associated with a reference signal received from a donor distributed unit device via a backhaul communications link;
        determining a power control adjustment based on a difference between the first power spectral density and the second power spectral density;
        transmitting the power control adjustment to the donor distributed unit device;
        based on an indication that the power control adjustment has been performed, transmitting an incremental power control adjustment to the donor distributed unit device, wherein the incremental power control adjustment comprises an incremented value relative to a previous power control value; and
        receiving a transmission in accordance with the incremental power control adjustment.

2. The relay device of claim 1, wherein the operations further comprise:
    receiving a downlink transmission from the donor distributed unit device via the backhaul communications link, and wherein a power level of the downlink transmission is in accordance with the power control adjustment.

3. The relay device of claim 2, wherein a third power spectral density associated with the downlink transmission is less dense than the second power spectral density.

4. The relay device of claim 1, wherein the reference signal comprises a synchronization signal block that facilitates a synchronization of signals between the donor distributed unit device and the relay device.

5. The relay device of claim 1, wherein the reference signal comprises a channel state information reference signal used by receiving devices to provide channel state information feedback.

6. The relay device of claim 1, wherein the uplink transmission comprises a physical uplink scheduling channel transmission.

7. The relay device of claim 1, wherein the second power measurement comprises a received signal reference power representative of a power measurement associated with the reference signal.

8. The relay device of claim 1, wherein transmitting the power control adjustment further comprises transmitting information usable to identify the relay device.

9. A method, comprising:
    measuring, by relay equipment comprising a processor, a first power level associated with an uplink transmission received from a user equipment via an access communication link;
    measuring, by the relay equipment, a second power level associated with a reference signal received from a donor distributed unit device via a backhaul communications link;
    determining, by the relay equipment, a power control adjustment representative of a difference between a first power spectral density associated with the first power level and a second power spectral density associated with the second power level;
    facilitating, by the relay equipment, transmitting the power control adjustment to the donor distributed unit device;
    based on an indication that the donor distributed unit device has completed the power control adjustment, transmitting, by the relay equipment, an incremental power control adjustment to the donor distributed unit device; and
    receiving, by the relay equipment, a transmission from the donor distributed unit device in accordance with the incremental power control adjustment.

10. The method of claim 9, wherein facilitating the transmitting of the power control adjustment comprises facilitating the transmitting of the power control adjustment via a radio resource control message.

11. The method of claim 9, further comprising facilitating, by the relay equipment, receiving a downlink transmission from the donor distributed unit device via the backhaul communications link, wherein a third power level of the downlink transmission is representative of the power control adjustment.

12. The method of claim 11, wherein the downlink transmission is transmitted at the third power level that is lower than the second power level.

13. The method of claim 12, further comprising, determining, by the relay equipment, whether a further power adjustment is to be performed based on a measurement of the third power level.

14. The method of claim 13, wherein transmitting the incremental power control adjustment to the donor distributed unit device is further based on a determination that the further power adjustment is to be performed.

15. The method of claim 14, wherein transmitting the incremental power control adjustment comprises transmitting the incremental power control adjustment via a physical uplink control channel.

16. A non-transitory machine-readable medium, comprising executable instructions that, when executed by a processor of a network relay, facilitate performance of operations, comprising:
    measuring a first power level associated with an uplink transmission received from a user equipment;
    measuring a second power level associated with a reference signal received from a donor distributed unit device via a downlink transmission;
    deriving a power control adjustment that is representative of a comparison between the first power level and the second power level;
    facilitating transmitting the power control adjustment to the donor distributed unit device;
    based on an indication that the power control adjustment has been implemented by the donor distributed unit device, facilitating transmitting an incremental power control adjustment to the donor distributed unit device; and facilitating receiving a transmission from the donor distributed unit device in accordance with the incremental power control adjustment.

17. The non-transitory machine-readable medium of claim 16, wherein facilitating the transmitting of the power control adjustment further comprises facilitating the transmitting of the power control adjustment via a radio resource control message.

18. The non-transitory machine-readable medium of claim 16, wherein the operations further comprise facilitating receiving a subsequent downlink transmission from the donor distributed unit device, and wherein a third power level of the subsequent downlink transmission is representative of the power control adjustment.

19. The non-transitory machine-readable medium of claim 18, wherein the subsequent downlink transmission is transmitted at the third power level, wherein the third power level is lower than the second power level, and wherein facilitating the transmitting of the incremental power control adjustment to the donor distributed unit device is further based on a determination that a further power adjustment is to be performed based on an analysis of the third power level.

20. The non-transitory machine-readable medium of claim 19, wherein facilitating the transmitting of the incremental power control adjustment comprises facilitating the transmitting of the incremental power control adjustment on a physical uplink control channel used to transmit control signals from the relay device to the donor distributed unit device.

* * * * *